United States Patent [19]
Jin et al.

[11] Patent Number: 5,999,671
[45] Date of Patent: Dec. 7, 1999

[54] TUNABLE LONG-PERIOD OPTICAL GRATING DEVICE AND OPTICAL SYSTEMS EMPLOYING SAME

[75] Inventors: Sungho Jin, Millington; Paul Joseph Lemaire, Madison; Ashish Madhukar Vengsarkar, Berkeley Heights, all of N.J.

[73] Assignee: Lucent Technologies Inc., Murray Hill, N.J.

[21] Appl. No.: 08/957,956

[22] Filed: Oct. 27, 1997

[51] Int. Cl.[6] .................................................... G02B 6/34
[52] U.S. Cl. .................................................. 385/37; 385/13
[58] Field of Search .................................. 385/24, 13, 37

[56] References Cited

U.S. PATENT DOCUMENTS

| | | | |
|---|---|---|---|
| 5,682,445 | 10/1997 | Smith | 385/7 |
| 5,699,377 | 12/1997 | Pan | 372/6 |
| 5,706,375 | 1/1998 | Mihailov et al. | 385/24 |
| 5,719,971 | 2/1998 | Smith | 385/1 |
| 5,781,667 | 7/1998 | Jin et al. | 385/37 |

*Primary Examiner*—Hung N. Ngo

[57] ABSTRACT

A device and method for dynamically tuning a long-period grating of an optical fiber is disclosed. The grating is made tunable by using a controlled strain imposed on the fiber adjacent the grating, wherein the strain comprises an electromechanical force, magnetostrictive force, magnetic force, or a thermally-induced force. An improved optical communication system comprising a dynamically gain-equalized amplifier device, a wavelength feedback device, and the tunable long-period grating device is also disclosed. In the communications system, the grating device is reconfigured to have a desired broadband filtering frequency, thus equalizing the amplifier gain, in response to feedback from the wavelength detector.

22 Claims, 12 Drawing Sheets

TUNABLE LONG-PERIOD OPTICAL GRATING DEVICE AND OPTICAL SYSTEMS EMPLOYING SAME

FIELD OF THE INVENTION

This invention relates to a long-period grating device that is made tunable by applying strain to the fiber grating. The tunable optical grating may be coupled to amplifier devices and dynamic wavelength feedback devices to comprise improved optical communication systems. In response to the feedback, the grating device adjusts the broadband loss frequency and equalizes the amplifier gain for efficient telecommunication processes.

BACKGROUND OF THE INVENTION

Of the technology available for achieving high data rate transmission over optical fibers, densely- spaced wavelength-division multiplexing (WDM) is a promising candidate. Optical fibers are key components in modem telecommunication systems. Basically, optical fibers are thin strands of glass capable of transmitting an optical signal containing a large amount of information over long distances with very low loss. In essence, an optical fiber is a small diameter waveguide comprising a core having a first index of refraction surrounded by a cladding having a second (lower) index of refraction. Typical optical fibers are made of high purity silica with minor concentrations of dopants to control the index of refraction.

A typical optical fiber communications system comprises a source of optical input signals, a length of optical fiber coupled to the source, and a receiver coupled to the fiber for receiving the signals. One or more amplifying devices are disposed along the fiber for amplifying the transmitted signal. Pump energy must be supplied to operate the amplifier. Contemplated optical fiber systems use digitally modulated optical signals at a wavelength of 1.55 micrometers and erbium-doped fiber amplifiers.

One problem limiting the capacity of such systems is that the erbium-doped fiber amplifier has a characteristic spectral dependence providing different gain for different wavelength channels. This spectral dependence poses a problem for multichannel WDM systems, because different gains for different channels leads to high bit error rates in some of the channels. In this case, a spectral shaping device helps flatten the gain spectrum of the amplifier.

Long-period fiber grating devices provide wavelength dependent loss and may be used for spectral shaping. A long-period grating couples optical power between two copropagating modes with very low back reflections. A long-period grating typically comprises a length of optical fiber wherein a plurality of refractive index perturbations are spaced along the fiber by a periodic distance $\Lambda$ which is large compared to the wavelength $\lambda$ of the transmitted light. In contrast with conventional Bragg gratings, long-period gratings use a periodic spacing $\Lambda$ which is typically at least 10 times larger than the transmitted wavelength, i.e. $\Lambda > 10\lambda$. Typically $\Lambda$ is in the range 15–1500 micrometers, and the width of a perturbation is in the range $\frac{1}{5}\Lambda$ to $\frac{4}{5}\Lambda$. In some applications, such as chirped gratings, the spacing $\Lambda$ can vary along the length of the grating.

Long-period fiber grating devices selectively remove light at specific wavelengths by mode conversion. In contrast with conventional Bragg gratings in which light is reflected and stays in the fiber core, long-period gratings remove light without reflection by converting it from a guided mode to a non-guided mode. A non-guided mode is a mode which is not confined to the core, but rather, is defined by the entire waveguide structure. Often, it is a cladding mode. The spacing $\Lambda$ of the perturbations is chosen to shift transmitted light in the region of a selected peak wavelength $\lambda_p$ from a guided mode into a nonguided mode, thereby reducing in intensity a band of light centered about the peak wavelength $\lambda_p$. Alternatively, the spacing $\Lambda$ can be chosen to shift light from one guided mode to a second guided mode (typically a higher order mode), which is substantially stripped to provide a wavelength dependent loss.

Long-period grating devices are thus useful as filtering and spectral shaping devices in a variety of optical communications applications. Key applications include spectral shaping for high-power broadband light sources (C. W. Hodgson, et al., 9 *Optical Society of America Technical Digest Series*, Paper TuG3 (1996)), gain equalization for optical amplifiers (A. M. Vengsarkar et al. 21 *Optical Letters* 336, (1996)), band rejection in cascaded high-power Raman lasers (S. G. Grubb et al., *Laser Focus World*, p. 127 (February 1996)), and filtering amplitude spontaneous emission in erbium doped amplifiers (A. M. Vengsarkar et al., 14 *J. Lightwave Technol.* 58 (1996)). See also U.S. Pat. No. 5,430,817 on "Optical Systems and Devices Using Long Period Spectral Shaping Devices" by A. M. Vengsarkar, issued on Jul. 4, 1995.

One use of the long-period gratings is flattening the gain of broadband amplifiers for WDM systems. For WDM applications, multiple channels, each operating at several gigabits per second, must be accommodated within the 1530- to 1560-nm band of an erbium-doped fiber amplifier (EDFA). A nonuniform amplifier gain profile, however, leads to uneven signal amplitudes in the different channels, an effect exacerbated by the gain-peaking tendency of an amplifier chain. This amplitude variation between channels can be canceled out by a device with a transmission spectrum matched to the inverted erbium gain spectrum.

A difficulty with conventional long-period gratings, however, is that their capability to equalize amplifier gain is limited, because they filter only a fixed wavelength acting as wavelength-dependent loss elements. Each long-period grating with a given periodicity ($\Lambda$) selectively filters light in a narrow bandwidth centered around the peak wavelength of coupling, $\lambda_p$. This wavelength is determined by $\lambda_p = (n_g - n_{ng}) \cdot \Lambda$, where $n_g$ and $n_{ng}$ denote the effective index of the core mode and the cladding mode, respectively. The values of $n_g$ and $n_{ng}$ are dependent on the relative values of the refractive indices of the core, cladding, and air.

In a long-period grating, transmission loss can be tailored by inducing different levels of index change in the fiber during fabrication, i.e., by choosing different materials for fabricating the core and cladding of the optical fiber. For example, an erbium gain spectrum is first decomposed into a sum of two Gaussians. Two filters are fabricated, their shapes tailored by varying the exposure times. These gratings are then concatenated to produce a composite transmission spectrum. Used in conjunction with an erbium-doped fiber amplifier, this device can yield a flat gain spectrum with variation less than 0.2 dB over a 25- to 30-nm band.

While long-period gratings may be fabricated to address the transmission loss in WDM systems, the effectiveness of the gratings is yet limited. In the future, multi-wavelength communication systems will require reconfiguration and reallocation of wavelengths among the various nodes of a network depending on user requirements, e.g., with programmable add/drop elements. This reconfiguration will impact upon the gain of the optical amplifier. As the number of channels, passing through the amplifier changes, the inversion level of the erbium ions is altered, leading to non-uniform gain shapes. Thus, the amplifier will start showing deleterious peaks in its gain spectrum, requiring modification of the long-period grating used to flatten the amplifier. Modifying the long-period grating implies altering either the center wavelength of the transmission spectrum or the depth of the coupling.

Accordingly, there is a need for a long-period grating for use as a gain equalizer whose transmission spectrum can be controlled as a function of the number of channels and power levels transmitted through the amplifier. It is desirable to have a tunable (or reconfigurable) long-period grating which, upon activation, can be made to dynamically filter other wavelengths (i.e., besides $\lambda_p$.) Further, it is desirable to be able to selectively filter a broad range of wavelengths, e.g., for efficient operation of multiple-channel WDM in telecommunication systems. This invention discloses such a tunable long-period grating device.

SUMMARY OF THE INVENTION

Summarily described, the invention embraces a tunable long-period grating device. The long-period grating is made tunable by using an element or body for imposing stress or strain on the fiber grating and hence altering the peak wavelength of coupling $\lambda_p$ (the filtered wavelength). A force-generating element or body interacts with the strain-inducing body to cause a strain to be imposed by electromechanical force, magnetostrictive force, magnetic force, or a thermally-induced force. The strain on the fiber grating, which may be tensile or compressive, alters the $\lambda_p$ via changes in the periodicity and the effective indices of the fiber grating core and cladding. The invention further embraces an improved optical communications systems comprising the tunable grating device.

BRIEF DESCRIPTION OF THE DRAWINGS

The advantages, nature and additional features of the invention will appear more fully upon consideration of the illustrative embodiments described in the accompanying drawings. In the drawings:

FIGS. 18 and 19 illustrate alternative embodiments for amplifying the thermal-in.

It is to be understood that these drawings are for purposes of illustrating the concepts of the invention and are not to scale.

DETAILED DESCRIPTION OF THE INVENTION

Figure 1:
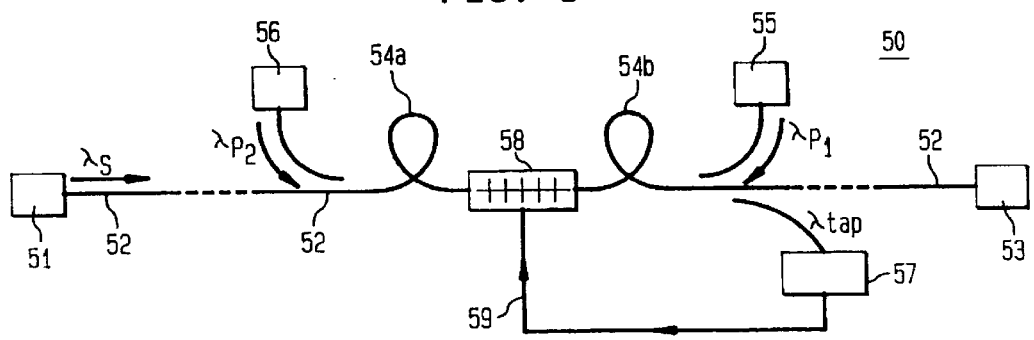
FIG. 1 schematically illustrates a dynamically gain-equalized optical amplifier system according to the invention.

Referring to FIG. 1, an optical communication system according to the invention is described. The system 50 comprises dynamically gain-equalized optical amplifiers, a reconfigurable long-period spectral shaping device, and a feedback device. Specifically, the system 50 comprises a transmitter source 51 of optical signals such as a digitally modulated 1.55 $\mu$m signal, an optical signal path comprising a length of optical fiber 52 for transmitting the signal, and a receiver 53 for receiving and demodulating the signal. One or more optical amplifiers, such as erbium-doped fiber amplifiers 54a, 54b, are disposed in the optical signal path for amplifying the transmitted signal. The amplifiers are pumped by pump sources 55, 56, of optical energy of pump wavelengths $\lambda_{p1}$ and $\lambda_{p2}$.

One of the preferred uses of the device of FIG. 1 is to reduce spectral dependence in the gain output of an optical amplifier. For example, the characteristic gain spectrum of an erbium-doped optical fiber amplifier has a pair of gain peaks at about 1.53 $\mu$m and at about 1.56 $\mu$m. Thus, a signal at 1.53 $\mu$m will be amplified more than one at 1.54 $\mu$m, which would be disadvantageous in a wavelength division multiplexing (WDM) system.

By properly choosing the number of perturbations and the dosage of exposure in the long-period grating, and by optimal tuning of the grating via a feedback system, the gain spectrum of the amplifier device combination can be made substantially flat over a range of wavelengths 1530 to 1560 nm. For a typical erbium amplifier, the shaping device exposed by a dosage$\leq$100 mJ/cm$^2$, 1000 pulses per slit will produce a more uniform gain response over the range of wavelengths 1530–1560 nm. The tunable system comprises a tunable long-period optical grating device 58. The device 58 is connected to a feedback system 59, having a wavelength detector 57 coupled to the fiber 52 for detecting the wavelength response $\lambda_{tap}$. The feedback system 59 automatically adjusts the tuning of the device 58 depending upon $\lambda_{tap}$. Advantageously, system 50 can be a WDM system using a plurality of different wavelength signals, e.g. $\lambda_{s1}$ and $\lambda_{s2}$, and a plurality of tunable grating devices coupled to one or more detectors.

The long-period grating in the inventive, gain-equalized optical communication system is made tunable (or reconfigurable) by using a device for imposing strain in the fiber grating and hence altering the peak wavelength of coupling $\lambda_p$ (the filtered wavelength). The strain may be imposed by electromechanical force, magnetostriction, magnetic force, or a thermally-induced force. Devices for imposing such strain upon the fiber (and hence the grating), are described herein. The strain on the fiber grating, tensile or compressive, alters the $\lambda_p$ via changes in the periodicity, as well as via changes in the refractive indices of the fiber grating core and cladding.

(a) Electromechanically Tuned Long-Period Grating Devices

Figure 2A:
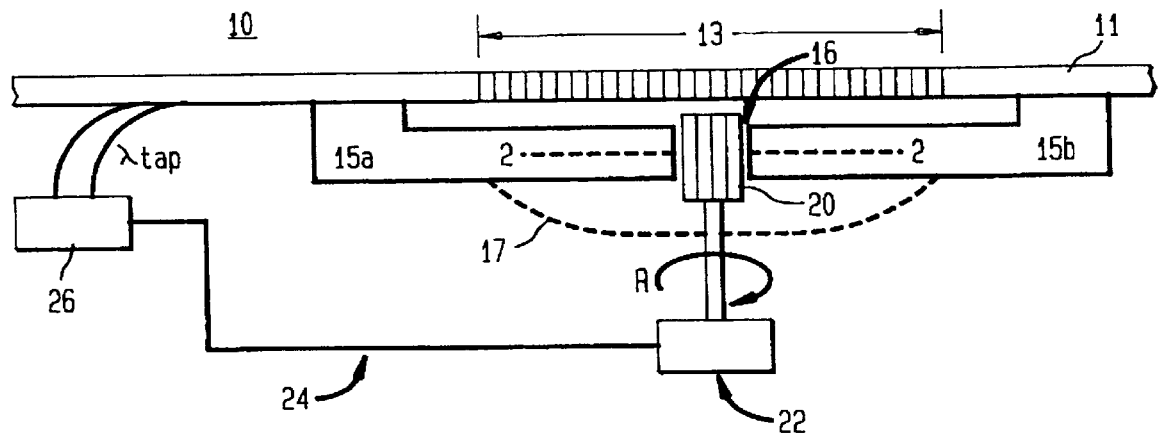
FIG. 2A illustrates an embodiment involving an electromechanically-tunable long-period fiber grating.

The electromechanically-tuned grating devices will be described with reference to FIGS. 2 through 4. Referring to FIG. 2A, the tunable device 10 comprises a fiber 11, having a long-period grating region 13, secured onto two rigid, load-carrying bodies 15a, 15b. The bodies 15a, 15b are geometrically separated with a gap 16 but are mechanically coupled (pulled together) by a biasing element 17. In the gap 16, a wedge 20 is placed which, upon actuation, adds or withdraws a predetermined (or programmed) amount of displacement or separation between the two load-carrying bodies 15a, 15b. The wedge may be coupled to a motor 22, for actuation. The actuating motor 22 desirably has a fine displacement control, e.g., with a resolution of at least 5 microns, preferably at least 1 micron, and even more preferably at least 0.1 micron, with a frequency capability of at least 10 displacements per second. Such a motor is commercially available, e.g., in the form of a linear DC servo motor. A feedback system 24 and wavelength detector 26 are coupled to the motor. The system 24 controls the rotation or movement of the actuating motor (and consequently the displacement on the fiber grating), based on the wavelength response $\lambda_{tap}$ detected by the detector 26.

Figure 2B:
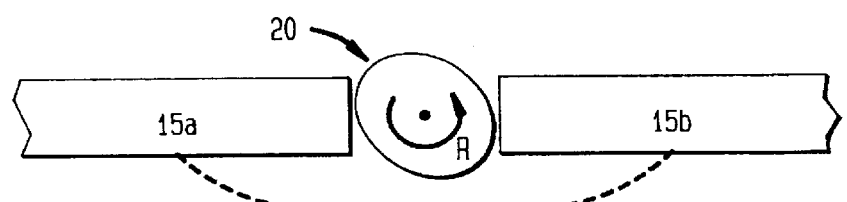
FIGS. 2B–2D illustrate alternative embodiments for the wedge of FIG. 2A, involving an electromechanically-tunable long-period fiber grating.
Figure 2C:
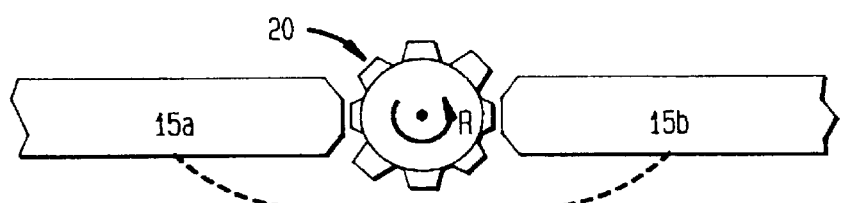
Figure 2D:
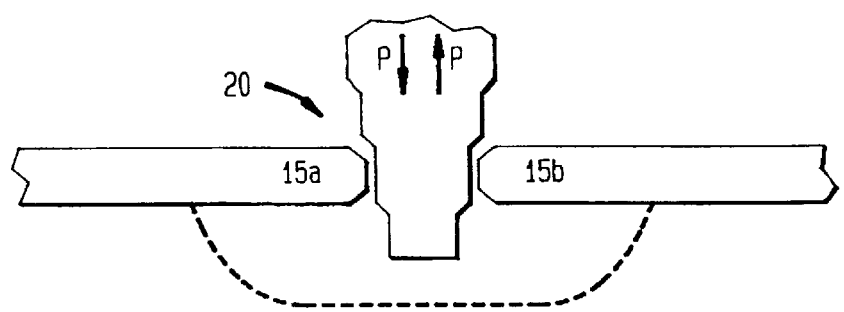

FIGS. 2B through 2D illustrate exemplary configurations for the wedge 20, each reflecting cross-sectional side views taken along the line 2—2 of FIG. 2A. FIG. 2B shows the wedge having a smooth but non-spherical configuration, whereas FIG. 2C shows the wedge having a generally circular configuration but with a plurality of protrusions on its outer surface to produce a step-wise variation in the circumference. The wedges of FIGS. 2B and 2C rotate about the arrow R (also depicted in FIG. 2A). With a controlled degree of rotation by the actuating motor 22, a predetermined amount of displacement can be added or subtracted between the two load-carrying bodies. The wedge can have other configurations, for example, a linearly-moving wedge with step-wise side edges is illustrated in FIG. 2D. With this configuration, the actuating motor pushes and pulls the wedge between the bodies 15a, 15b, following the arrows P—P of FIG. 2D, to add or withdraw displacement. In the wedge of the push-pull type, the wedge could also have a frusto-conical shape, with a smooth outer surface. As can be seen, various configurations are contemplated, with the important consideration being that the wedge have a varied or differential outer circumference so that displacement can be added or withdrawn between the bodies 15a, 15b.

The load-carrying bodies 15a, 15b, and the wedge 20 are preferably made of hard materials or with a hard surface to minimize frictional wear caused by the wedge movement. Suitable materials include high strength metals, ceramics, or composites. The metals or alloys can be chosen from steels, Cu-alloys, Ti-alloys, Ni-alloys, or like alloys. The materials for fabricating the hardened surface may comprise a carburized surface or a coating comprised of diamond or diamond-like-carbon. The ceramic parts can be made of, for example, alumina, silica, aluminum nitride or other nitride, oxide, carbide, or a mixture of these. The use of low friction materials on the surfaces subjected to the mechanical friction is advantageous not only for minimizing frictional wear but also for reducing accompanying uncertainties caused by associated dimensional changes, collection of debris, etc.

Also, to minimize strain caused by a thermal expansion mismatch between the fiber grating and the load-carrying bodies and wedge, advantageously the bodies and wedge are fabricated from the same material as the fiber grating, typically $SiO_2$. To minimize or control the temperature-induced strain when the bodies and wedge are comprised of metal, a thermal expansion matched material (similar to the value for $SiO_2$) or a zero thermal expansion material such as Invar (Fe-36 wt % Ni) may be used as a coating. The biasing element 17 in FIG. 2A can be a spring made of high spring constant materials such as stainless steels, Cu-alloys, etc.

Figure 3:
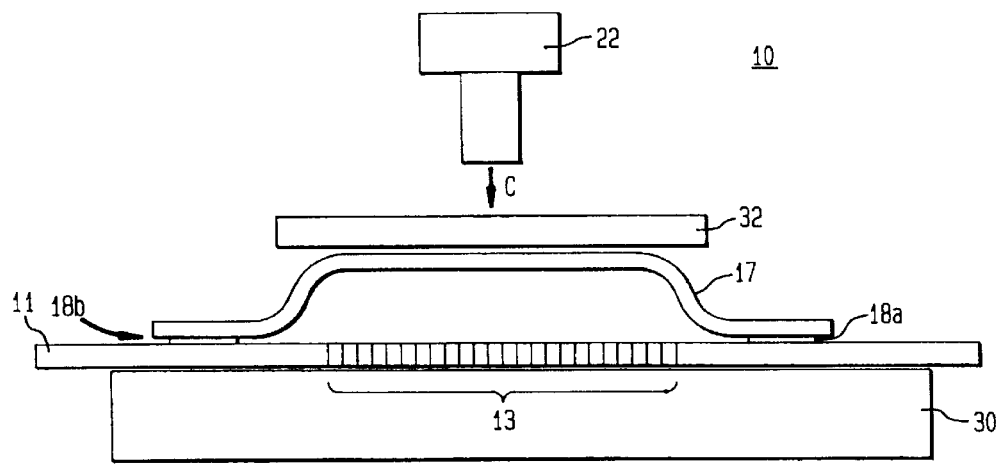
FIGS. 3 and 4 illustrate alternative embodiments for an electromechanically-tunable long-period fiber grating.

Shown in FIG. 3 is an alternative embodiment of the electromechanically-tuned fiber grating according to the present invention. In the Figures, the same character reference numbers are used to refer to like elements (not to imply that different character references denote elements fabricated with different materials). A section of the fiber 11 having a grating region 13 is placed on a flat substrate 30, the substrate 30 preferably having a guiding groove or slot on its surface (not shown) for receiving the fiber. Advantageously, diamond-like-carbon or other low friction material, such as polytetrafluroethene, commonly known as TEFLON®, may be applied on the surface of the substrate, i.e., in the groove section, on the fiber, or on both, to minimize frictional wear and friction-caused error in the control of strain in the fiber gratings. A biasing element 17 is then attached to the fiber, e.g., at two bonding regions 18a, 18b, outside the grating region 13.

The attachment at the bonding regions 18a, 18b, may be by epoxy bonding, solder bonding (with optional bond-enhancing metallization layers), brazing, glass-to-metal sealing, or mechanical gripping (preferably with some grooved or roughened surface for firm gripping). The biasing element 17 can be made with the same materials as the biasing element of FIG. 2A, discussed above, or it can be made of a $SiO_2$ plate or rod. Optionally, a rigid plate 32 is added over the biasing element for maintaining uniformity in the displacement. A motor 22, is actuated to compress the biasing element (i.e., following the arrow C), to control the amount of its elastic deformation and hence the force on the fiber grating to control the $\lambda_p$. A feedback system and wavelength detector (not shown), such as illustrated in FIG. 2A can be used to control the actuating motor and the resultant $\lambda_p$ value with this embodiment as well.

Figure 4:
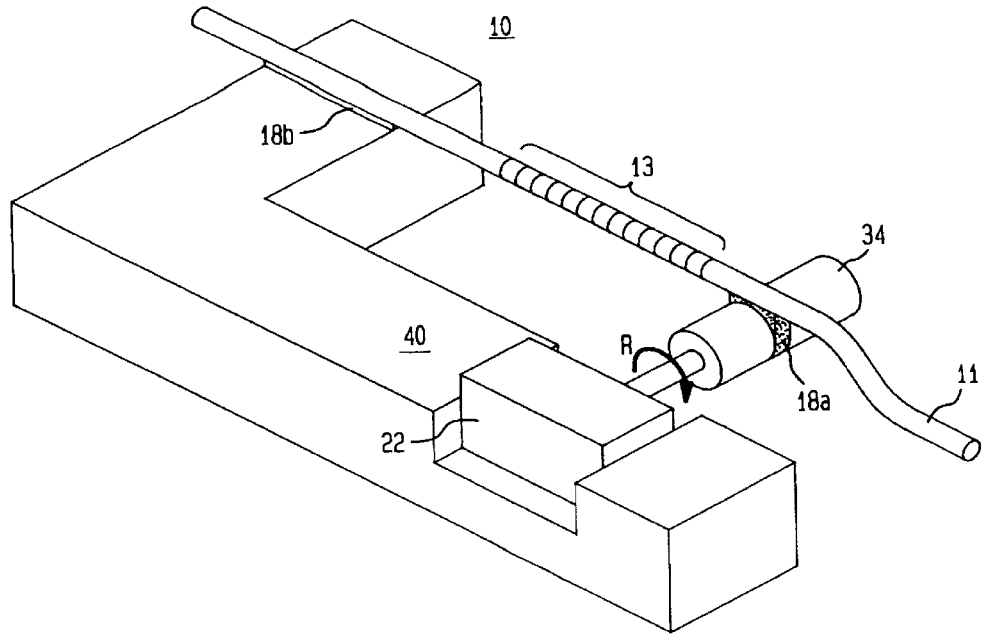

Shown in FIG. 4 is yet another embodiment of the electromechanically-tuned grating device. Here, a portion of the fiber 11 adjacent one end of the grating region 13 is secured onto a substrate 40 (preferably made of a material with a thermal expansion coefficient substantially matched with that of $SiO_2$). Adjacent the other end of the grating region, the fiber 11 is secured to a mandrel 34. An actuating motor 22 will cause the mandrel to rotate (following the arrow R), applying a controlled amount of tension on the fiber and altering $\lambda_p$ to a desired value. The actuating motor is also preferably connected to the substrate 32. The securing of the fiber 11 to the substrate 32 and mandrel 34 at the attachment regions 18a, 18b, can be performed with the same materials as discussed above with FIG. 3. This embodiment can be coupled to a feedback system and wavelength detector as well.

(b) Magnetostrictively Tunable Gratings

Figure 5A:
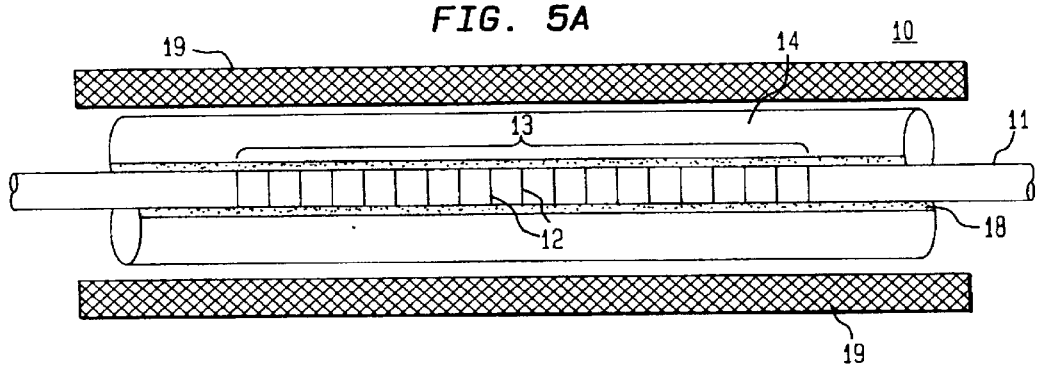
FIGS. 5A and 5B illustrate an embodiment involving a magnetostrictively tunable long-period fiber grating.

Magnetostrictively-tunable gratings will be described with reference to FIGS. 5 through 10. FIG. 5A schematically illustrates a tunable long-period fiber grating device 10 comprising a length of optical fiber 11 including a grating region 13, having a plurality of perturbations 12. The fiber at the grating region 13 is secured at an attachment region 18 to a body 14 of magnetostrictive material for transmitting compressive or tensile strain to the fiber 11. The body 14 can be a cylinder concentrically surrounding the fiber grating region 13, or it may have other configurations, such as a block, a pair of rods, or the like. An electromagnet (solenoid) 19 is disposed adjacent the body 14 for providing a controllable magnetic field to strain the body along the direction of the fiber grating.

The attachment region 18 may involve a mechanical attachment, such as by clamping, or it may involve bonding, such as with epoxy or solder. When the body 14 is cylindrical, the fiber is attached to the inner bore of the cylinder. When solder is used at the attachment region, the fiber surface is desirably coated with a metal layer to improve solder bond strength. If the strain induced on the fiber is tensile, the attachment region between the magnetostrictive body and the fiber may be restricted to the areas 18c, 18d, outside the grating, as illustrated schematically in FIG. 5B.

The body 14 is comprised of a material, such as a ferromagnetic or ferromagnetic material, which expands or contracts in length when an externally applied magnetic field magnetizes the material and aligns internal magnetic domains. Application of short duration magnetic pulses can be used to alter the length of the body 14 and hence the length (and spacing) of the attached fiber grating 13. The magnetic pulses can be produced by applying current pulses to the electromagnet 19 from a source of pulsed current (not shown).

The magnetostriction of the materials comprising the body 14 can be either positive (to cause an increase in length of the body) or negative (to cause a decrease in length). Some exemplary materials that may be used to fabricate the body 14, which exhibit negative magnetostriction and have a saturation strain ($\epsilon_s$), are nickel ($\epsilon_s \sim -38 \times 10^{-6}$), cobalt ($\epsilon_s \sim -50 \times 10^{-6}$), and SmFe$_2$ ($\epsilon_s \sim -2340 \times 10^{-9}$). Examples of materials that may be used which exhibit positive magnetostriction are the following alloys and compositions: Fe-20 weight %Ni ($\epsilon_s \sim +33 \times 10^{-64}$); 70%Co-30%Fe ($\epsilon_s \sim +130 \times 10^{-6}$); Fe-30%Cr-15%Co ($\epsilon_s \sim +61 \times 10^{-6}$); the Fe—Al—Mi—Co alloy commonly known as Alnico ($\epsilon_s \sim +36 \times 10^{-6}$); Fe$_3$O$_4$ ferrite ($\epsilon_s \sim +32 \times 10^{-6}$); TbFe$_2$ ($\epsilon_s \sim +2600 \times 10^4$) and a Th$_{0.28}$Dy$_{0.72}$Fe$_2$ alloy ($\epsilon_s \sim +1100 \times 10^{-6}$). The magnitude of the magnetostriction, as well as its field-dependent behavior, varies somewhat with the material composition and processing. Optimization of these parameters is desirable to maximize the strain. For further details concerning magnetostrictive materials, see R. M. Bozorth, *Ferromagnetism*, Chapter 13, pp. 647–49, 663–69 (Van Nostrand, New York, 1951); A. E. Clark, *AIP Conference Proc. No. 18*, American Institute of Physics, p. 1015 (New York, 1974), and W. R. Jones, *IEEE Trans. Mann.* Vol. MAG-17, p. 1459 (1981), all of which are incorporated herein by reference.

As the grating is subjected to tensile strain, several changes take place. First, the grating periodicity tends to increase due to a stretching effect. Secondly, the Poisson effect leads to a reduction in the lateral dimensions (diameter) of the waveguide (fiber). Third, the refractive index: of the waveguide can change due to the photoelastic effect. All these effects directly impact upon the effective indices of the two modes. In general, the straining effect has less of an impact on the: effective indices of the cladding modes as compared with the effective indices of the guided modes.

For a nominal (median) beam wavelength for optical fiber communication of $\lambda \sim 1550$ nm, the corresponding long-period fiber grating has a periodic spacing $\Lambda$ of ~330 $\mu$m. In multichannel wavelength division multiplexing systems, a change in the gain spectrum will necessitate a change in the gain-equalizing filter such that the peak wavelength of a long-period grating will have to be tuned by about 2 nm. This wavelength shifting corresponds to a strain in the long-period fiber grating of $\Delta\epsilon \sim 6.6 \times 10^{-4}$. Such a strain is obtainable, for example, by using TbFe$_2$ or SmFe$_2$ to fabricate the magnetostrictive body 14.

Figure 6:
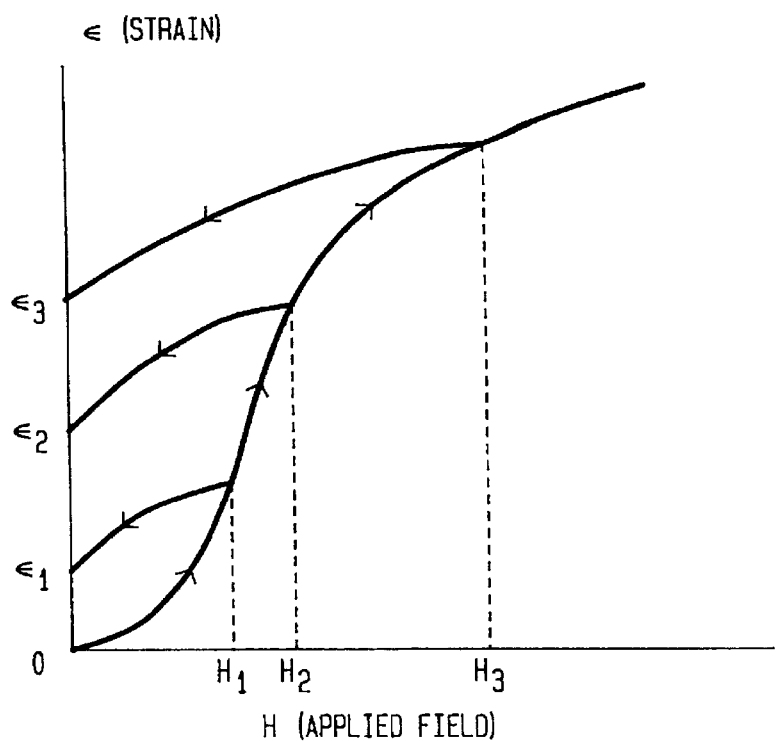
FIG. 6 is a schematic graphical illustration for describing how the remanent strain can be programmed by adjusting the applied magnetic field.

FIG. 6 is a schematic plot of the magnetostrictive strain $\epsilon$ as a function of the applied magnetic field H. There is a residual or remanent magnetostrictive strain after the magnetic field is removed. The remanent strains for the field strengths H$_1$, H$_2$, and H$_3$ are $\epsilon_1$, $\epsilon_2$, and $\epsilon_3$, respectively. The magnitude of this remanent strain depends on the magnitude of the applied field. As can be seen from FIG. 6, the remanent strain is programmable by selecting a proper field strength. For a magnetostrictive straining device with a latching capability, the magnetostrictive material advantageously has semi-hard or permanent magnetic properties rather than soft magnetic properties. The desired coercivity (H$_c$) of the magnetostrictive material is at least 0.50 Oe, preferably al: least 20–100 Oe, and more preferably at least 1000 Oe.

Figure 7:
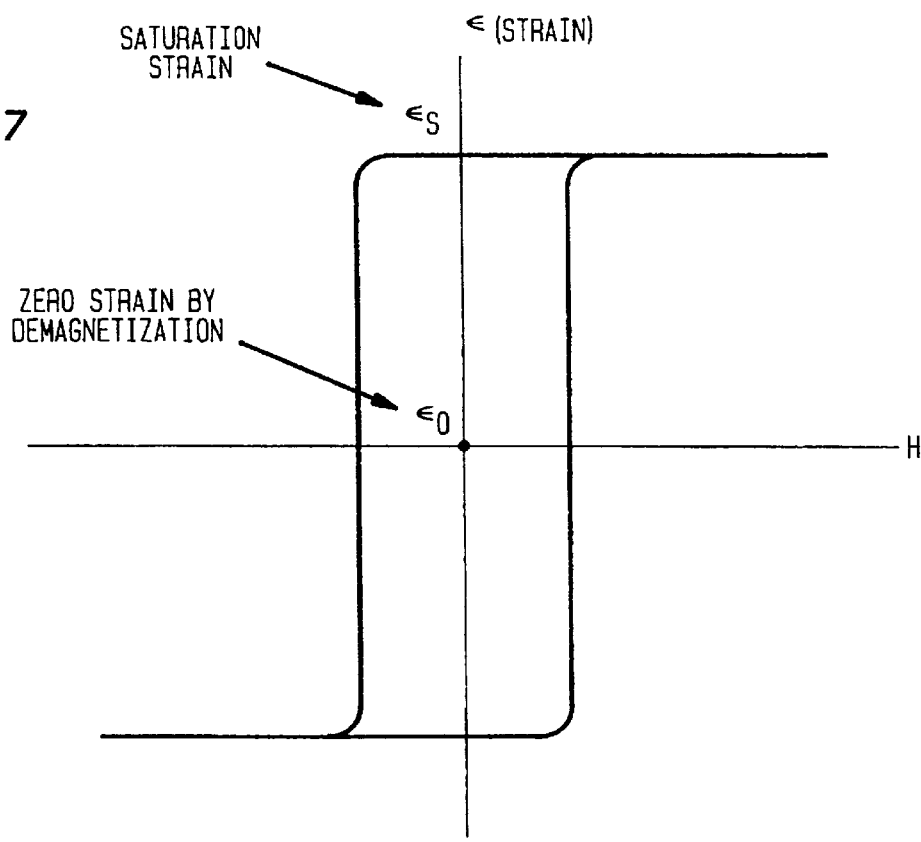
FIG. 7 is a schematic graphical illustration showing the bi-stable nature of the induced strain in the fiber grating.

FIG. 7 is a plot of the magnetostrictive strain $\epsilon$ versus an applied field H for a cyclic variation showing a typical square hysteresis loop. Such behavior is useful to produce a bistable device, that is, a device where basically two levels of strain are applied to cause wavelength switches between optical wavelengths, $\lambda_1$ and $\lambda_n$. Once the magnetizing field is removed, most of the saturation magnetization and saturation strain es is retained, giving rise to a latchable strain (i.e., corresponding with optical wavelength $\lambda_n$.) If, for example, zero strain corresponds with optical wavelength $\lambda_1$, the magnetostrictive material can be brought back to zero strain by demagnetizing it with an AC field gradually diminishing in amplitude. Alternatively, if the optical wavelength $\lambda_1$ corresponds with an intermediate remanent strain, partial demagnetizing with an AC or a reverse DC field can be used to obtain the desired strain level. The use of a pulse field is desirable to avoid the continuous use of electrical power. The speed of pulse magnetization can be typically ir the range of $1-10^{-8}$ sec, and is preferably $10^{-2}-10^{-6}$ sec. The amplitude of the pulse magnetizing field is preferably in the range of 50–50,000 Oe, depending on the coercivity and the shape of the magnetization curve for the magnetostrictive material.

The magnetostrictive hysteresis loop preferably should have a square-loop shape with a squareness ratio of about 0.85 or greater, preferably at least 0.90, and more preferably at least 0.95. The squareness ratio is the ratio of the remanent induction to the saturation induction.

Figure 5B:
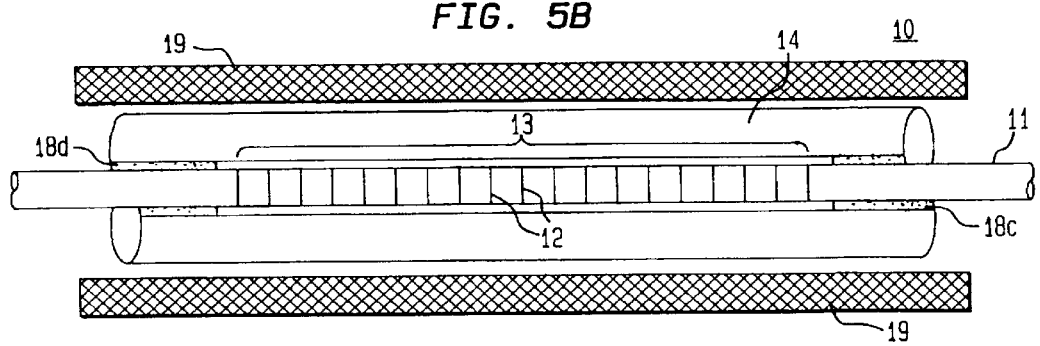

With the device of FIGS. 5A and 5B, the applied field optionally can be amplified by disposing soft magnetic pole pieces at either end of the magnetostrictive body 14. Pure iron poles, for example, can achieve, at a field of less than 100 Oe, a saturation magnetization of 20,500 gauss, which is the upper limit of the magnetic field obtainable from the pole surface. A magnetic flux return path (preferably of iron-based or other high saturation soft magnetic alloys) can be used between opposing ends of the magnetostrictive body. This reduces the leakage flux and thus should provide the maximum use of available magnetization.

Figure 8:
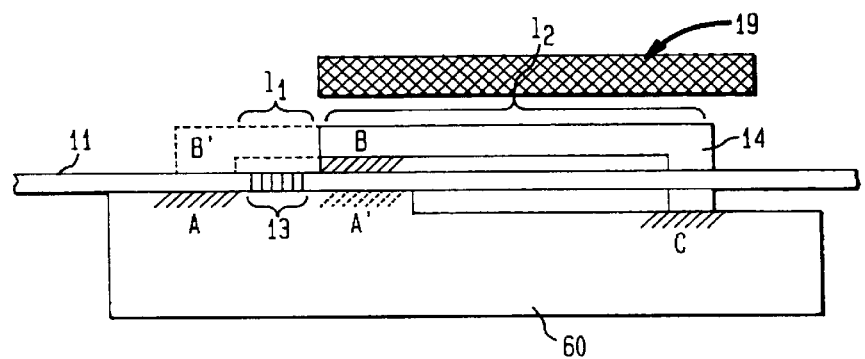
FIGS. 8 and 9 illustrate alternative embodiments for amplifying the strain imposed on the tunable fiber grating.

The magnitude of magnetostriction will depend on the materials used for the magnetostrictive body 14. However, the magnitude of magnetostriction may also be enhanced with an alternative embodiment used to amplify the strain applied to the grating. For example, FIG. 8 illustrates such an alternative embodiment. Here, the magnetostrictive body 14 applying the strain has a length $l_2$, and the long-period grating region 13 has a length $l_1$, where the length $l_2$ of the body 14 is substantially longer than the length $l_1$ of the grating 13. The fiber 11 is attached adjacent one end of the fiber grating region 13 to a substrate 60 at Point A. Adjacent the other end of the grating region 13, the fiber is attached to the magnetostrictive body 14 at Point B. The magnetostrictive body is attached to the substrate at Point C. With this configuration, when the magnetostrictive strain is introduced, as, for example, by pulse magnetization, the magnetostrictive strain on the fiber grating is amplified by the ratio of $l_2/l_1$. If the magnetostrictive body 14 is ten times longer than the fiber grating 13, the strain $\epsilon_s$ will be about ten times larger than is attainable in a FIG. 5 configuration.

The substrate 60 can be configured as a flat-surfaced block or a cylinder, or it may take other shapes, with the important consideration being that it hold the fiber region 13 and body 14, each having different lengths, adjacent each other. The magnetostrictive body 14 can also be blocked or cylindrical. For positive magnetostriction materials, the grating in FIG. 8 will contract when a field is applied, and for negative materials, the grating will elongate. The sign of induced strain can be reversed by modifying the design of the device. For example, in FIG. 8, if the magnetostrictive body 14 is attached to the fiber 11 at Point B' instead of Point B, and the fiber (at other end of the grating region) is attached to the substrate at Point A' instead of Point A, the grating will, for positive magnetostriction, be elongating instead of contracting. If a contracting strain on the fiber is used, the grating should be confined in a tight-fitting, low-friction (optionally lubricated) capillary tube to minimize lateral deflection or local sticking of fiber and to maintain a uniform applied strain on the fiber.

Figure 9:
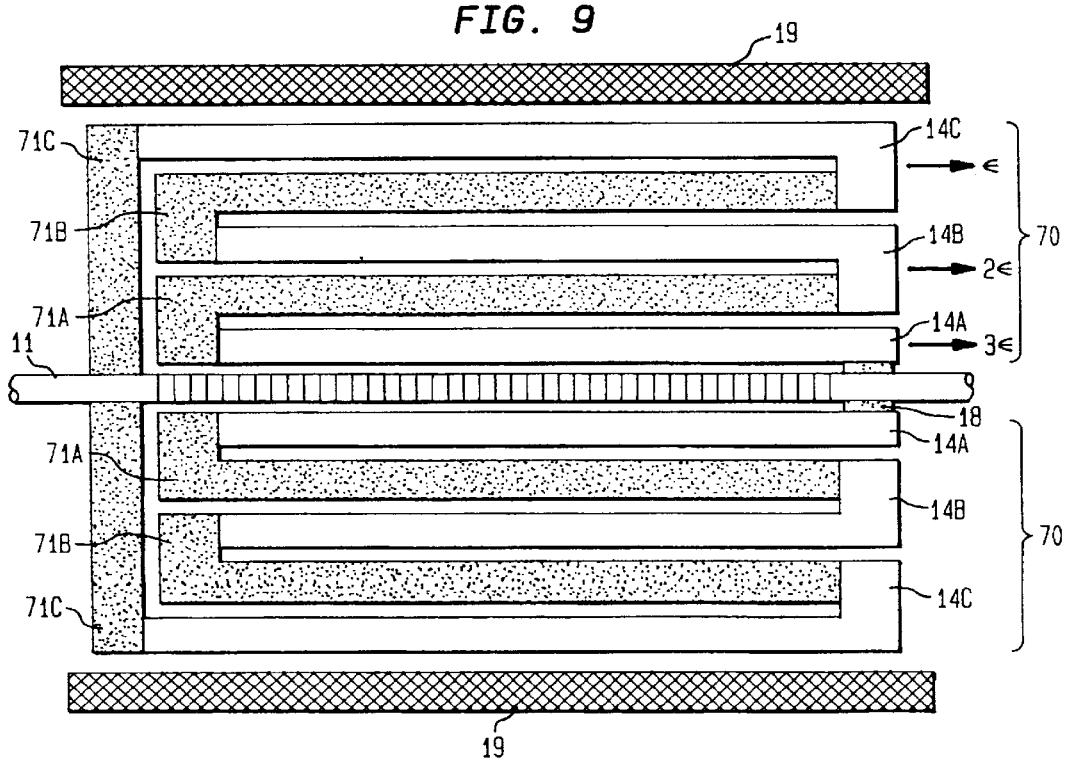

FIG. 9 shows an alternative embodiment for amplifying the magnetostrictive strain which does not involve an increase in the length of the device. The magnetostrictive body 14 comprises a stack 70 of interconnecting and alternating non-magnetic layers 71A, 71B, 71C and magnetostrictive layers 14A, 14B, 14C. Opposing ends of each successive magnetostrictive layer are connected. This way, the total length of the layers is increased, without increasing the length of the device. The electromagnet 19 is placed adjacent the layers, and the bodies 14A, 14B, 14C, are attached to the fiber at the attachment region 18. Here, the magnetostrictive strain from the plurality of layers 14A, 14B, 14C accumulates to yield an amplified strain on the attached fiber 11. For example, an assembly consisting of 10 magnetostrictive layers comprised of an alloy of 70% Co-30% Fe ($\epsilon_s \sim +130 \times 10^{-6}$) will give a total tensile strain of about $1300 \times 10^{-6}$, causing a 0.13% change in the fiber grating dimension. For a grating with a corresponding $\lambda_p \sim 1550$ nm, this dimensional change can lead to a shift in wavelength by about 0.65 to 1.95 nm.

Figure 10:
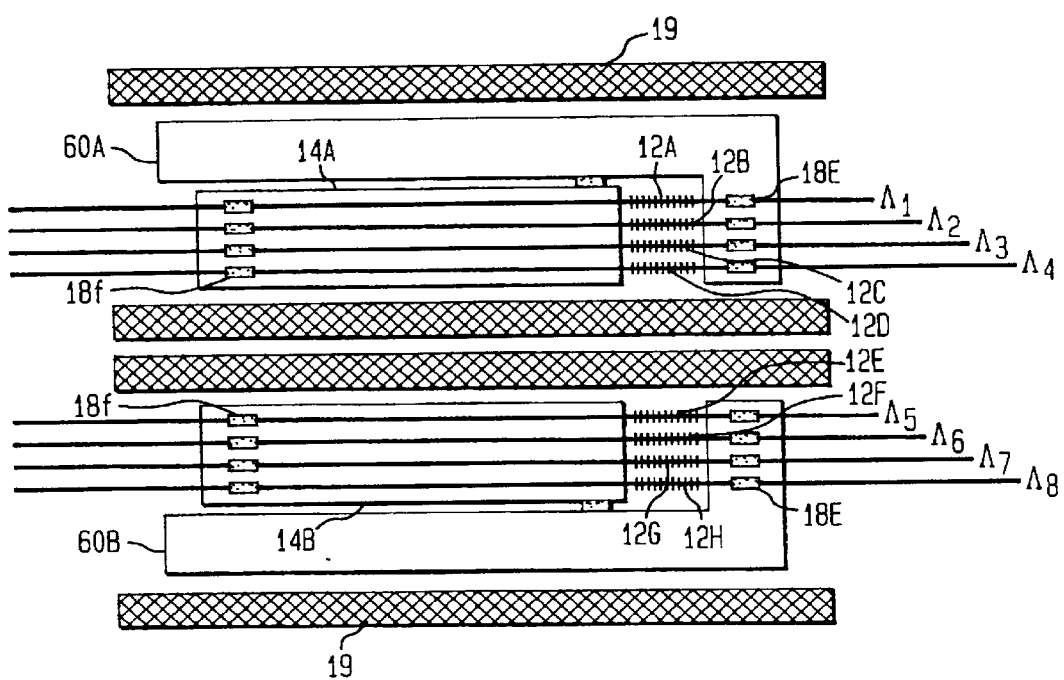
FIG. 10 is another embodiment for tuning plural long-period gratings.

Also, plural gratings can be secured to a single magnetostrictive body. FIG. 10 illustrates a device wherein a plurality of gratings 12A, 12B, 12C, 12D, 12E, 12F, 12G, and 12H are mounted on two different magnetostrictive bodies 14A, 14B at the attachment regions 18e. Each of the gratings can have different grating periods, as illustrated in FIG. 10, where the grating periods are $\Lambda_1-\Lambda_8$. Each body 14A, 14B, and its attached fibers are secured to respective substrates 60A, 60B, at the attachment regions 18f. If only the magnetostrictive block 14A is activated (magnetized) into the remanent state, corresponding peak wavelengths $\lambda_1-\lambda_4$ in the attached fiber gratings will be shifted. If the magnetostrictive block 14B is activated, the wavelengths $\lambda_5-\lambda_8$ will be shifted. A similar configuration can also be used with a multitude of gratings with the same grating period A if many fiber communication routes are to be controlled simultaneously.

(c) Magnetic-Force Tuned Gratings

Figure 11A:
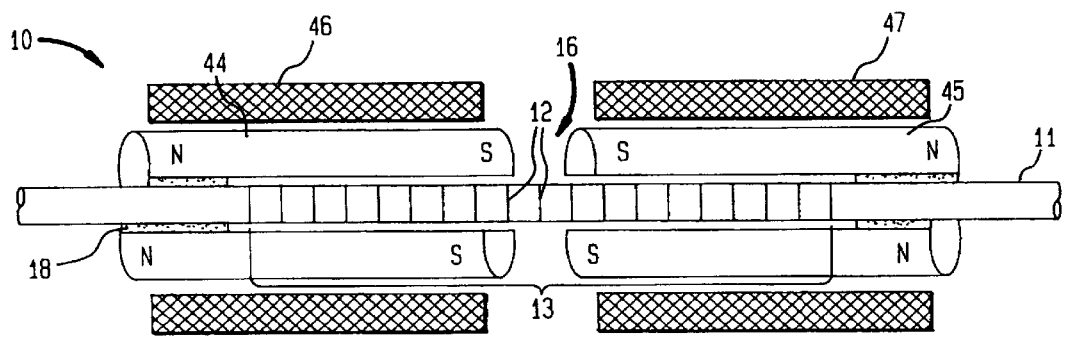
FIGS. 11A and B illustrate tunable long-period fiber gratings using magnetic strain tuning.

Instead of magnetostriction, magnetic repulsion or attraction, such as with the use of ferromagnetic or ferromagnetic components attached onto the fiber grating, can be used to induce strain in the fiber grating. Referring to the drawings, FIG. 11A schematically illustrates a tunable fiber grating 10 comprising a length of optical fiber 11 including a grating region 13 having a plurality of index perturbations 12. The fiber is secured adjacent the grating region 13 at the attachment region 18 to a pair of magnets 44, 45, having a small gap 16 between them. The magnets are advantageously permanent magnets, although they may be bodies of soft magnetic material such as iron. The magnets 44, 45 can be cylinders concentrically surrounding the fiber, or they may have other configurations, for example, they can be rectangular blocks. One or more electromagnets (solenoids) 46, 47 are disposed adjacent the magnets 44, 45 for providing a controllable magnetic field between them.

Figure 11B:
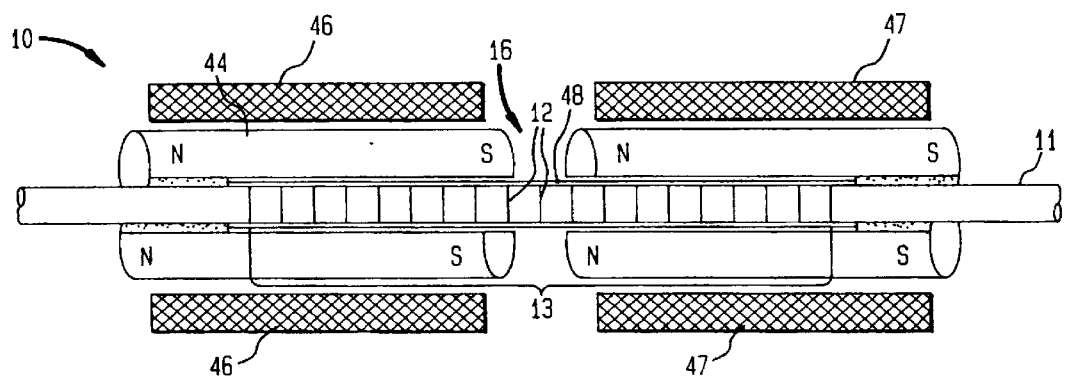

The fiber grating is firmly attached to the magnets at the attachment region 18, either by mechanical clamping or by bonding, as with epoxy or solder. To assure a strong bond and minimize strain relaxation at the interface of the fiber and magnets, the use of mechanically strong, non-thermoplastic adhesive or a solder with a relatively high melting point and high mechanical strength is desired. When solder is used, the fiber surface to be attached is desirably coated with a metal layer to improve the bond strength. The magnets 44, 45, can be disposed with their poles aligned in the same orientation or in opposing orientations, with the relative orientation impacting upon whether a tensile or compressive strain will be induced on the fiber. For example, FIG. 11A shows the magnets 44, 45, with their poles aligned in opposing directions, so that the south pole of magnet 44 is adjacent the north pole of magnet 45. Here, the application of the magnetic field will force the magnets apart from each other, producing a tensile elastic strain $\epsilon$ on the fiber. The tensile elastic strain $\epsilon$ will increase proportionally as the stress a of the magnets is increased to a degree dependent upon the elastic modulus of the fiber (i.e., $\epsilon = \sigma/E$ where E is the elastic modulus; for silica glass, $E=10.5 \times 10^6$ psi). Alternatively, as shown in FIG. 11B, magnets 44, 45 can be aligned in the same direction so that opposite poles are adjacent (S of magnet 44 is adjacent N of magnet 45). In this case, the field from the electromagnets 46, 47 will draw the magnets toward each other and a compressive strain will be produced on the fiber 11. When a compressive stress is applied, undesirable buckling or deflection of the fiber grating should be prevented or minimized. Thus, in this case, the fiber 11 at the grating region 13 is preferably encased in a fiber retainer tube (capillary tube) 48, restricting the off-axis movement of fiber grating. A suitable low-friction coating on the tube 48 or fiber 11, such as a fluorocarbon or diamond, may optionally be used for easy sliding of the fiber in the tube.

In operation, the force transmitted from the magnets to the fiber produces a strain at the grating region 13 which changes the wavelength response of the grating. When the fiber is stretched or compressed, the grating periodicity $\Lambda$ will also change. For example, the fiber could be stretched or compressed to cause a change in the grating periodicity by 1% ($\epsilon = \Delta l/l = 0.01$). The extent of the wavelength shift may depend on the type of long-period grating used, and it is typically in the range of a −7 to +15 nm shift in the peak wavelength, $\lambda_p$, as reported in an article by Bhatia and A. M. Vengsarkar (an inventor herein), 21 *Optical Letters* 692 (1996).

An important advantage of this embodiment is that continuous power is not required to maintain a wavelength shift. The plot of FIG. 6 is applicable to this embodiment, except here the strain $\epsilon$ of the horizontal axis reflects strain induced by magnetic repulsion or attraction rather than by magnetostriction. The strain varies as a function of the applied magnetic field H. There is a left-over remanent strain after the field is removed. The remanent strains for the field strengths $H_1$, $H_2$, and $H_3$ are $\epsilon_1$, $\epsilon_2$, and $\epsilon_3$, respectively. The magnitude of this remanent strain depends on the magnitude of the applied field, and it is therefore programmable by selecting a proper field strength. To change a to a higher value, the applied H in a subsequent pulse is raised by increasing the pulse current in the solenoid. To lower $\epsilon$, a demagnetizing AC current with a diminishing amplitude is applied to partially demagnetize the magnets and the new magnetizing DC current pulse is applied to achieve the new desired remanent magnetization state.

Instead of making the grating tunable over a range of channels, the device can be configured so that the fiber grating is bistably tuned between two wavelengths. A magnetic material with strong anistropy and an axis of magnetization aligned parallel to the optical fiber axis has a square hysteresis loop. See Jin et al., IEEE Trans. Magn., MAG-23, No., 5, p. 3187 (1987), which is incorporated herein by reference. FIG. 7 is likewise applicable, wherein it now reflects a plot of the magnetically-induced fiber strain $\epsilon$ vs. applied field H. As can be seen, a cyclic variation of the field shows a square hysteresis loop with only one stable degree of strain, $\epsilon_s$. The use of deformation aged Fe—Cr—Co alloys is particularly preferred for providing magnets exhibiting such a loop shape.

With magnets exhibiting a square hysteresis loop, one can make bistable strain devices that switch between two filtering wavelengths: e.g. a zero strain wavelength $\lambda_0$ and a saturation-strained reflection wavelength $\lambda_1$. $\lambda_0$ is achieved by applying an AC demagnetizing field. $\lambda_1$ is achieved by applying a DC pulse current sufficient to saturate the magnets. An advantage of the bistable device is a reduced sensitivity to the applied current or to stray magnetic fields.

Figure 12A:
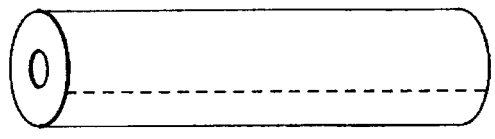
FIGS. 12A–12E show various shapes of components useful for inducing strain in the fiber gratings with magnetic or thermally-induced force.
Figure 12B:
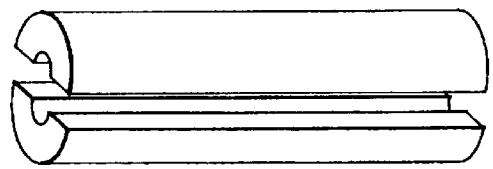
Figure 12C:
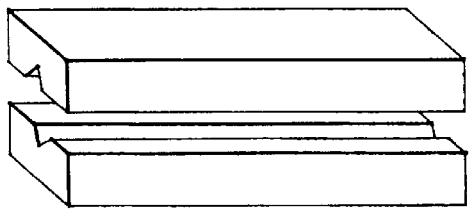
Figure 12D:
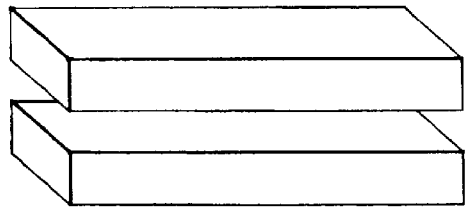
Figure 12E:
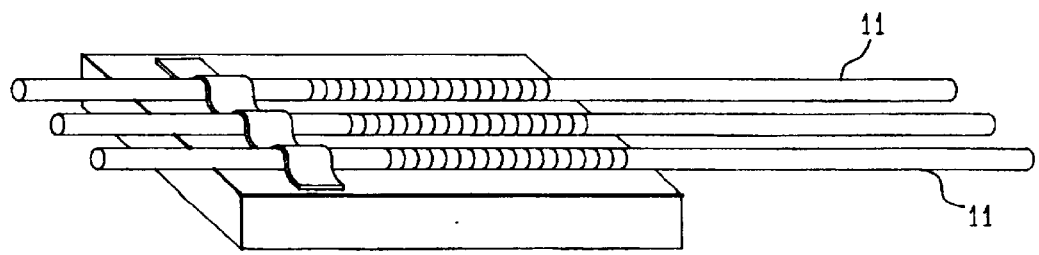

Referring again to FIGS. 11A and 11B, at least two magnets (which can be comprised of soft or hard magnetic materials), are needed for this embodiment of the invention. The magnets 44, 45, can be single pieces or they can be comprised of an aggregate of magnets. They are oriented with their magnetic poles disposed along an axis parallel to the axis of the fiber grating. At least a portion of each magnet 44, 45 preferably should be semi-hard or permanent with a remanent magnetization. Yet the strength of the magnets should be reprogrammable by altering the applied magnetic field. The magnets can take many shapes, with examples being the shape of a cylinder or a block. FIGS. 12A through 12E show a variety of exemplary shapes for the magnets 44, 45. For example, the magnets can be cylinders with a center hole (FIG. 12A), round or block-like, two-piece magnets (FIGS. 12B–D), or substrate-like magnets (FIG. 12E). The two piece magnet configuration with a grooved center axis is preferred because it makes assembly of the device more convenient than with other configurations.

For maximizing the magnetic force for a given volume of the magnet, the gap 16 between the facing poles of the magnets (e.g., 44, 55), should be small, since the magnetic force decreases as the gap is increased. The preferred gap is less than about 0.20 inches, and more preferably, less; than 0.050 inches.

The preferred materials for fabricating the magnets 44, 45, are those whose magnetic properties are modifiable by a pulse magnetic field. Some examples of suitable materials are Fe—Cr—Co, Fe—Al—Ni—Co (Alnico), Cu—Ni—Fe (Cunife), Co—Fe—V (Vicalloy), specially-processed, low-coercivity ($H_c$), rare earth cobalt (Sm—Co), or magnets comprising Nd—Fe—B, and Ba-ferrite or Sr-ferrite. The desired range of the coercivity is typically below 3000 Oe and preferably below 1000 Oe for ease of programming by re-magnetization using solenoid pulse field. The coercivity is typically above 50 Oe and preferably above 200 Oe for maintaining the stability of the remanent magnetization and for stability against demagnetization due to stray magnetic fields. The squareness ratio of the remanent magnetization and saturation magnetization is about 0.85, preferably alt least 0.90, and more preferably greater than 0.95. Mechanically ductile and easily machineable magnetic alloys such as Fe—Cr—Co, Cu—Ni—Fe, and Co—Fe—V are particularly preferred for fabricating magnets having a desired shape or geometry. Stable permanent magnets with high coercive forces, such as Sm—Co or Nd—Fe—B are less desirable (unless modified to exhibit lower coercive forces), because it is more difficult to reprogram the remanent magnetization of such materials using a low magnetic field. These stable magnets, however, can be used for supplying a basis (or bias) field, in combination with programmable magnets.

At least one solenoid winding is provided (two are shown in FIG. 11A, 11B—46, 47). The solenoid is disposed around the magnets to apply a programmed pulse field to adjust the remanent magnetization. This adjustment alters the strain on the fiber grating. A constant DC field, instead of a pulse field, can also be used, but the use of a pulse field is preferred to avoid having to supply a constant electrical current to the solenoid. The desired duration or speed of the pulse field is typically in the range of $1-10^{-8}$ seconds, preferably $1-10^{-6}$ seconds, and even more preferably $10^{-1}-10^{-4}$ seconds. For a thick magnet geometry, the use of faster pulses is less desirable because of the eddy current loss. The current pulse can take a number of shapes, e.g., rectangular, rectified sinusoidal, or irregular, as long as the maximum field needed for a magnetization to the pre-determined remanence is accomplished.

Figure 13A:
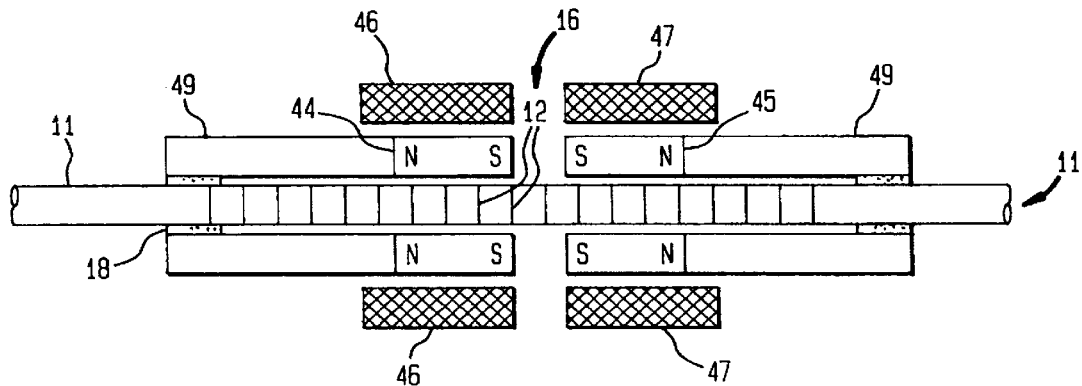
FIGS. 13 and 14 illustrate various alternative embodiments involving the use of magnetic strain tuning.
Figure 13B:
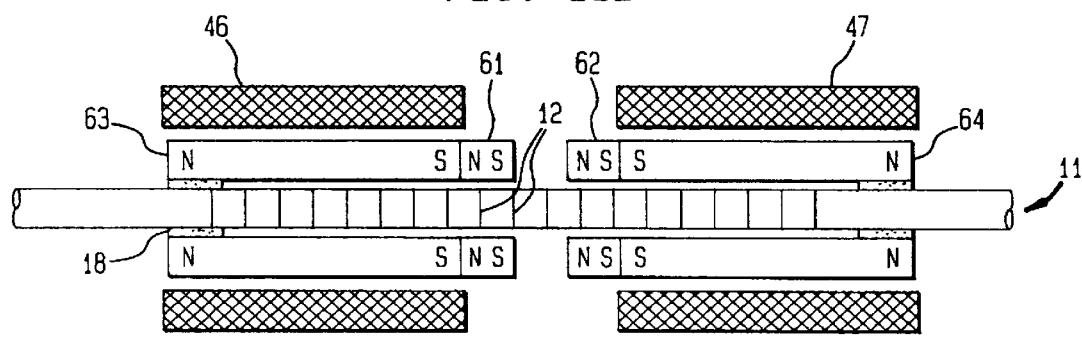
Figure 13C:
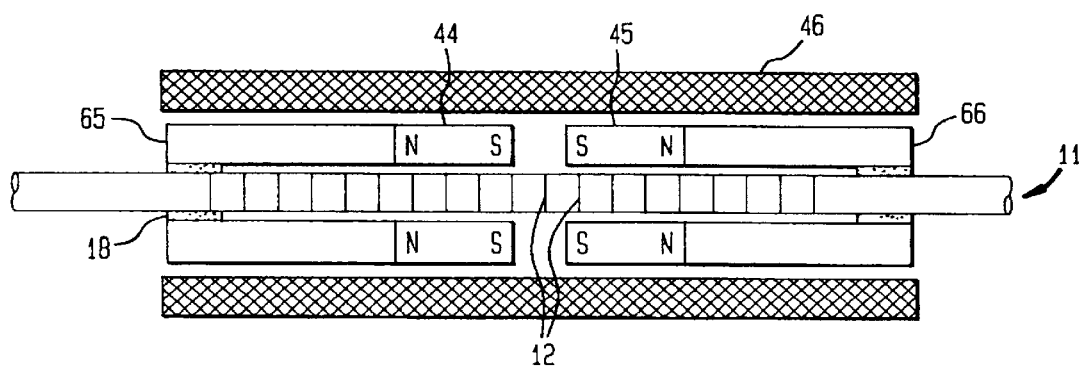

While the device configuration illustrated in FIGS. 11A, 11B is one of the simplest, other embodiments are contemplated. For example, in the embodiment of FIG. 13A, the two magnets 44, 45 and the accompanying solenoids 46, 47 are shorter than in FIG. 11 (i.e. relative to the length of the grating regions). The magnets 44, 45 still face each other with the axis of magnetization disposed parallel to the optical fiber axis, and a small gap 16 is disposed between them. The magnets are secured at the attachment region 18 to the fiber through an extension 49, comprised of nonmagnetic material. Glass, aluminum, copper, or stainless steel may be used to fabricate the extension 49. The viability of this configuration depends on the magnitude of desired wavelength tuning and the magnetic force obtainable with the short magnets. In the embodiment of FIG. 13B, small but strong, high-coercivity magnets 61, 62 (such as magnets comprised of Nd—Fe—B or Sm—Co) provide the bias field. The high-coercivity magnets 61, 62 are combined with low-coercivity programmable magnets 63, 64, which serve also as extensions to attach the high-coercivity magnets to the fiber at attachment region 18. Also, as illustrated in FIG.

13C, programmable magnets 44, 45 may be tuned through field-amplifying soft magnets 65, 66 (such as magnets comprised of iron, Ni—Fe permalloy, or Si-steel), for obtaining a higher magnetizing field with the use of a small electrical current in the solenoid 46 (one is shown here).

Figure 14:
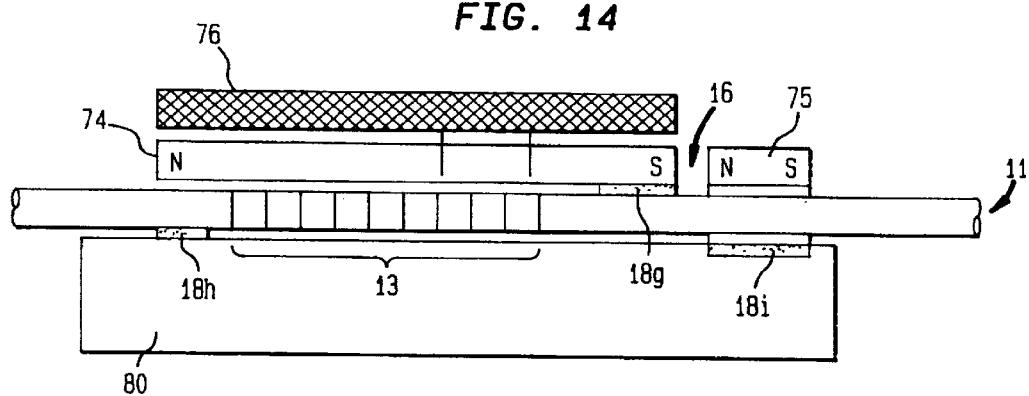

FIG. 14 illustrates yet another embodiment where a substrate 80 allows a tensile stress to be applied to the fiber grating using magnetic attraction between unlike poles. This configuration is convenient in that a tensile force on the fiber eliminates the need to guard against possible fiber buckling. Also, the attractive magnetic force maintains the axial alignment of the magnets so there is a minimal need to guard against lateral force. In this configuration, the fiber 11 is firmly fixed onto the substrate at attachment region 18$h$ adjacent one end of the fiber grating region 13. At the other end of the grating region 13, the fiber is fixed onto the leading end of the programmable magnet 74 at attachment region 18$g$. A second magnet 75 with a magnetically attractive arrangement is attached onto the substrate at attachment region 18$i$ with a gap 16 between the leading end of the programmable magnet 74 and the second magnet 75. Thus, this second magnet 75 is secured to the fiber through the nonmagnetic substrate 80.

The second magnet 75 can either be a programmable magnet or a non-programmable magnet contributing to the overall magnetic attractive force. In the latter case, the magnet can be comprised of very strong magnetic material, such as Sm—Co or Nd—Fe—B, or a field-amplifying soft magnetic material. A compressive, rather than tensile, stress on the fiber grating can be produced by modifying the configuration of the magnets relative to the fiber and the points at which the fiber is attached to the substrate and magnets.

(d) Thermally-tunable Gratings

Figure 15:
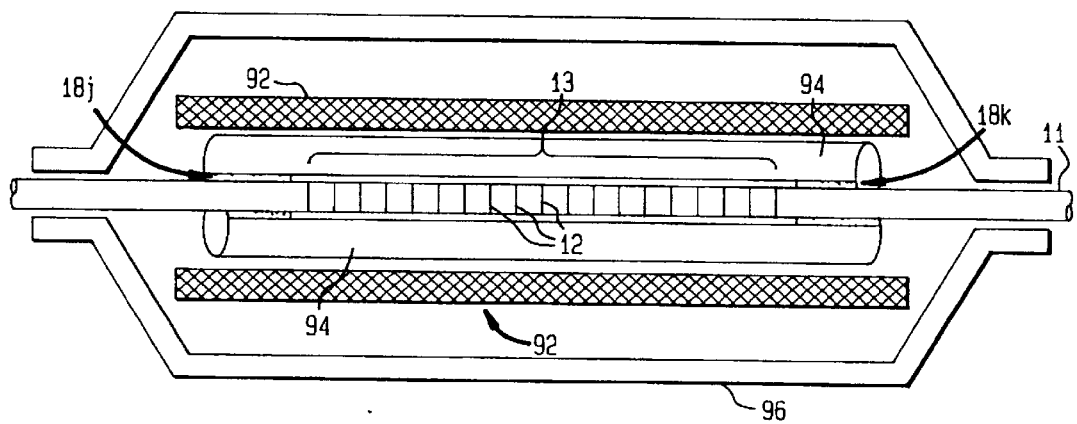
FIGS. 15 and 16 illustrate alternative embodiments of a thermally-tunable fiber grating.

Another embodiment of the invention uses a temperature-sensitive body 94 with a large-amplitude thermal expansion or contraction in conjunction with a heating element to tune the grating. Referring to FIG. 15, a temperature-sensitive body 94 is secured onto the fiber 11 for exerting strain on the long-period fiber grating 13. The amount of strain and hence the degree of tuning of $\Lambda$ (and $\lambda_p$) are controlled by heating or cooling the temperature-sensitive body 94, the extent of which may be pre-determined according to feedback from the wavelength detector (FIGS. 1, 57, 59).

Common metallic or ceramic materials strong and stable enough to maintain a constant level of stress on optical fibers typically exhibit thermal expansion coefficients near room temperature of about zero to $25 \times 10^{-6}/°$ C. However, given a highest possible ambient temperature of ~50° C., commercially viable and convenient temperature changes are focused on the range of between 50° C. and 80° C., for a total $\Delta T$ of 30°. With common metallic or ceramic materials, the maximum amount of temperature-induced strain that will be imposed on the fiber by the temperature-sensitive body for that range of temperature excursion (and hence the amount of strain to be placed on the fiber grating) is about $7.5 \times 10^{-4}$ (or 0.075%). This amount of strain is not sufficient to make the broadband control of the filtering frequency, $\lambda_p$, satisfactory for useful applications.

With the present invention, a temperature-sensitive body having large thermal expansion or contraction properties is used so that a sufficient tuning range for $\lambda_p$ is obtained within the desired temperature range of about between ~50° C. and ~80° C. The desired tuning range is obtained by fabricating the temperature-sensitive body with materials having a large magnitude thermal expansion coefficient or by configuring the temperature-sensitive body so as to amplify the strain induced by the body.

Also, one of the recognized problems with fiber grating devices involves the undesirable sensitivity of the fiber grating to a change in the ambient (or other service) temperature of the devices. This problem has required the use of specially designed, temperature-compensating packages, see e.g., U.S. patent application Ser. No. 08/716,658, filed Sep. 6, 1996, titled "Long Period Fiber Grating Devices Packaged for Temperature Stability," to Judkim, Lemaire (an inventor herein), and Tensyske, assigned to Lucent Technologies, the assignee herein, which application is hereby incorporated by reference. In the present invention, the temperature is under control with the active temperature-controlled wavelength tuning, and thus, the sensitivity of the fiber grating to temperature variation can be pre-incorporated into the programming of the wavelength tuning, avoiding the need for additional temperature-compensating packages. Additionally, even with the magnetically tunable long-period grating devices (earlier embodiments described with reference to FIGS. 5–14), the magnetic tuning can incorporate controls for ambient temperature variations, thereby making use of additional temperature-compensating packages unnecessary.

Referring to FIG. 15, a temperature-sensitive body 94 with a large magnitude (negative or positive) coefficient of thermal expansion is secured onto the surface of the long-period fiber grating at attachment regions 18$j$, 18$k$. The fiber may be attached to the body by soldering, brazing, epoxy bonding, glass-to-metal sealing, or cement bonding. Mechanical clamping, preferably with some recess or groove on the surface of the fiber 11 or the temperature sensitive body 94, may also be used. To aid in the adhesion, one or more metallization or adhesion-promoting layers may optionally be added onto either the fiber or the temperature-sensitive body or both. As the level of compressive strain sought to be placed on the fiber grating increases, preferably the percentage of the fiber surface that is bonded onto the temperature-sensitive body should be increased as well. If a tensile stress is to be used, however, the bonding or clamping should be applied only at the regions just outside the grating region 13, thus minimizing the risk of deteriorating the mechanical or optical properties of the fiber. Such an approach is shown in FIG. 15, for example, as the bonding is applied at two bonding regions 18$j$ and 18$k$, just outside the grating region 13.

A controlled heating or cooling of the temperature-sensitive body is accomplished with a heating element 92 placed near the temperature-sensitive body 94, as shown in FIG. 15. The heating element 92 can be chosen from a variety of known devices, e.g., a winding of electrical resistive heating element wire, a radio-frequency induction heater, a quartz lamp heater, or other heating devices known in the industry. Using a feedback from thermocouple, the temperature of the heating element 92 is altered to a value that corresponds with the desired strains in the temperature-sensitive body and the fiber. The desired temperature can be maintained by using an insulating oven shell 96, until a need arises to alter the wavelength again. The heating element 92 may be placed outside the temperature-sensitive body 94, as shown in FIG. 15, or it may be incorporated with it or even disposed between the body 94 and the fiber 11.

Figure 16:
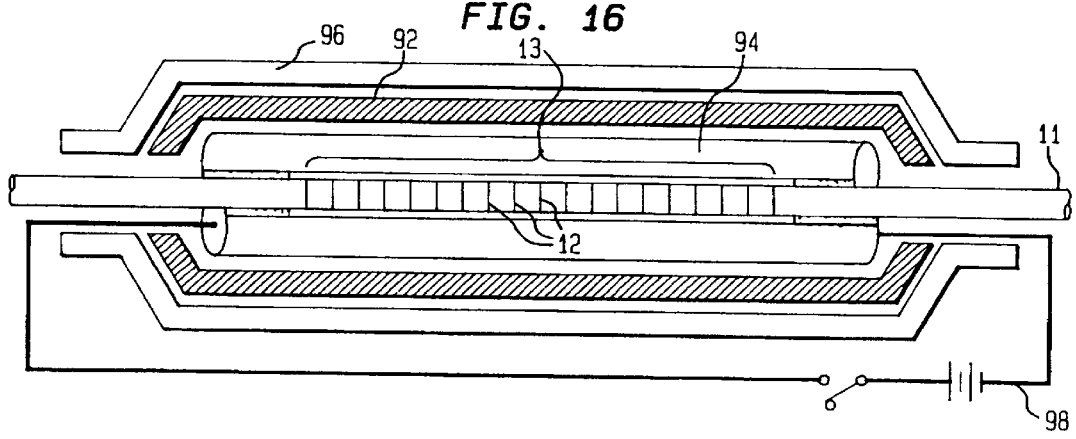

An advantageous approach of adjusting the temperature of the body 94, according to the invention, is to use for the heating element 92, a power source coupled to the body 94, as illustrated in FIG. 16. Here, a power source 98 is coupled to the temperature-sensitive body for sending a continuous or interrupted current to the body 94. Resistive heating of the body thereby can be accomplished, thus eliminating the need for a separate heating device. This advantageously allows a simplified device configuration which is more compact and also more reliable (as compared, for example, with the embodiment depicted in FIG. 15).

The temperature-sensitive body can have either a positive or negative coefficient of thermal expansion (CTE), to induce a compressive or tensile strain. One of the preferred materials for fabricating the temperature-sensitive body is an alloy that will exhibit phase transformation (for changes in crystal structure) near room temperature. The advantages of fabricating the grating device with such alloys (as compared to devices having commonly-used metals or ceramics) include i) providing a more sensitive device with greater dimensional changes at smaller temperature changes, and ii) allowing easier resistive heating, that is, when the temperature-sensitive body itself is used as a heating element such as is illustrated with FIG. 16. Unlike common metallic or ceramic materials having CTEs of about $0-25\times10^{-6}/°C.$, the preferred alloys used for the temperature-sensitive body 94 according to the invention have a much larger magnitude of CTE.

An example of such an advantageous alloy for the temperature-sensitive body is Ni—Ti with an approximate composition of 56%Ni and 44%Ti in weight %. Although this alloy may exhibit a phenomenon commonly known as "shape memory effect," with this invention, the shape memory effect is avoided. With a "shape memory effect," a material plastically deformed into a. certain shape will recover its original shape on heating to a moderately high temperature, due to the martensitic phase transformation by deformation and reverse transformation to the original crystal structure. However, this is not a repeatedly reversible process, because a subsequent cooling will not restore the material to its deformed configuration. Thus, in the present invention, the range of temperature change is intentionally chosen to be less than the temperature range that would result in a complete phase transformation. This way, the phase transformation on heating is only partially completed (e.g., less than one-half, preferably less than one-third), and some of the parent phase regions always remain present to serve as nuclei for easy and reproducible reverse transformation (and reversible dimensional changes), on cooling. Accordingly, the shape memory effect is avoided, and reversible phase transformations and associated dimensional changes (via expansion or contraction) are used.

Figure 17:
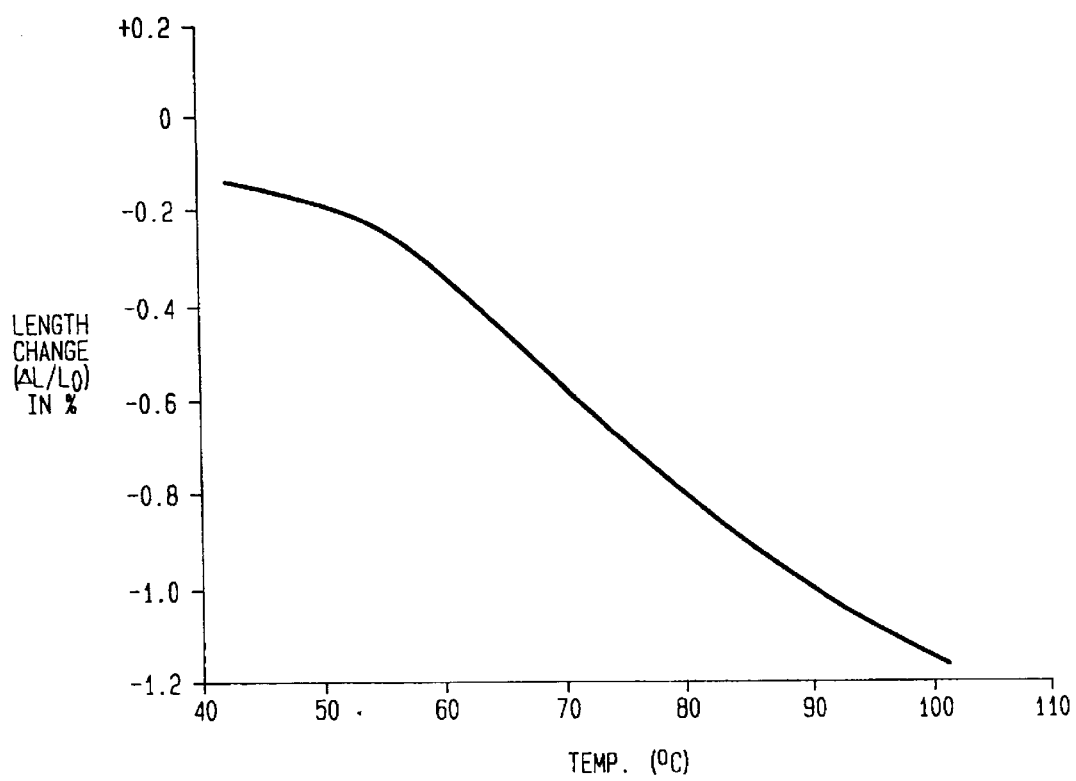
FIG. 17 shows the change in the length of a Ni—Ti alloy rod with temperature useful for the temperature-sensitive body of the thermally-tunable fiber grating device.

Shown in FIG. 17 is thermal expansion data for a 56%Ni-44%Ti alloy rod wire having about a 0.120 inch diameter. As reflected in FIG. 17, because of the phase transformation involved, the dimensional change in terms of strain $\epsilon$ ($\epsilon=\Delta L/L_0$) is negative, unlike many metals and alloys which exhibit a positive coefficient of thermal expansion. For a change in temperature of 30 degrees ($\Delta T=30°$), where the temperature is in the range 50° to 80° C., a is about $-60\times10^{-4}$ or about −0.6%, and the coefficient of thermal expansion (CTE) is about $-200\times10^{-6}$. This is about an order of magnitude higher than most common metals and ceramics. The available strain of $60\times10^{-4}$, when transferred to optical fiber gratings in FIGS. 15 and 16, is sufficient to alter the peak wavelength spanning about 3–9 nm.

In the exemplary embodiments of FIGS. 15 and 16, the temperature-sensitive body made of the exemplary Ni—Ti alloy of FIG. 17, can be bonded onto the fiber grating at the two bonding regions 18*j*, 18*k*, just outside the grating portion. Also, one can pre-strain the fiber grating by applying tension while bonding it to the temperature-sensitive body. This way, a suitable residual strain can be maintained in the fiber at the ambient temperature. Then, when the tunable fiber grating device is operated, i.e. by controlling the temperature changes, the negative CTE of the Ni—Ti alloy will cause the residual stress in the fiber to be reduced by a controlled amount. This will result in a tensile strain and an anticipated change in the fiber grating wavelength response.

The temperature-sensitive body can be cylindrical or it can have another shape. Exemplary variations illustrated in FIGS. 12A–12E, may be used. The temperature-sensitive body can have a much larger mass than the fiber grating, and it may not be necessary to induce strain around the fill circumference of the fiber. For example, one may use only one half of the pieces in FIGS. 12B–D, if desired (i.e. FIG. 12E).

The desired composition range of the Ni—Ti based temperature-sensitive body is typically about 48–64 weight % Ni, with the balance Ti, and preferably 52–60% Ni, with the balance Ti. Other alloying elements such as V, Cr, Mn, Fe, Co, Mo, Nb, Ta, W, Pd, Cu, and Zn may also be present in an amount less than 5 wt %, as long as the temperature range of phase transformation is near ambient temperature, e.g., between −50° and +150° C. Other alloys with phase transformation occurring near ambient temperature may also be used, for example, Cu—Zn—Si (30–40 wt % Zn, 0.5–1.5%Si, balance Cu), Cu—Al—Ni (10–20%Al, 1–5%Ni, balance Cu) and Cu—Sn (20–30% Sn, balance Cu). For a desirably large magnitude coefficient of thermal expansion, the phase transformation near ambient temperature (e.g. at the −50° to +150° C. range) is important to the operation of the invention. The CTE may be positive or negative depending on the specific alloy composition and processing. In shape memory type alloys involving martensitic and stress-induced phase transformations, the type and degree of residual stress in the processed alloy can be adjusted to control the magnitude and sign of the CTE. The desired magnitude of CTE in the temperature-sensitive metallic or ceramic body in the inventive devices is at least $30\times10^{-6}$, preferably at least $50\times10^{-6}$, and even more preferably at least $100\times10^{-6}$ near the device operation temperature.

Figure 18:
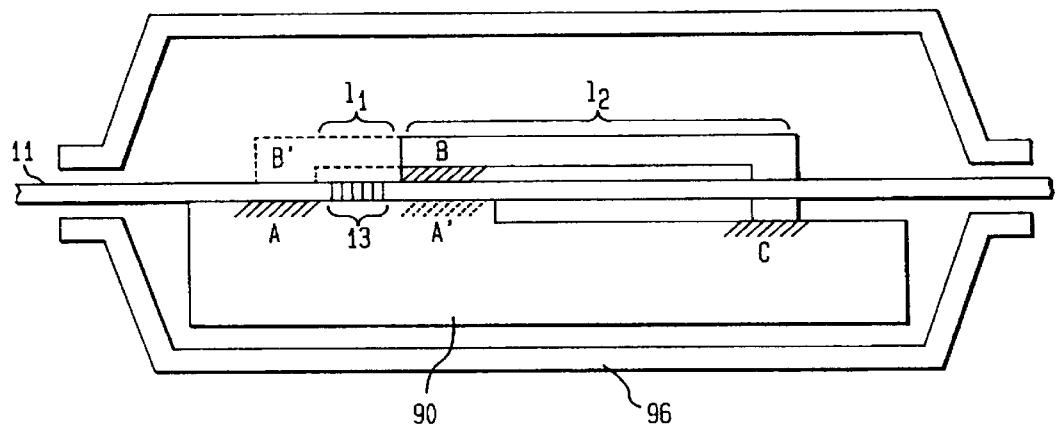

The magnitude of thermal expansion or contraction can be amplified by an alternative embodiment of the invention as illustrated in FIG. 18. In the figure, the fiber grating region 13 has a length $l_1$ and the temperature-sensitive body 94 has a length $l_2$. At one end of the fiber grating region 13, the fiber 11 is attached and fixed onto a rigid low-CTE substrate 90 at Point A. At the other end of the fiber grating region, the fiber 11 is attached to one end of the temperature. sensitive body 94 at Point B. The temperature-sensitive body is attached to the substrate 90 at Point C. When the temperature inside the oven is altered, i.e., by controlling electric power to the heating element, the body 94 expands or contracts, and if the substrate 90 is made of near-zero CTE material, the temperature-induced strain on the fiber grating is amplified by the ratio of $l_2/l_1$. A suitable near-zero CTE material to be used for this purpose is the alloy commonly known as Invar (Fe-36%Ni alloy). If the temperature-sensitive body is ten times longer than the fiber grating region 13, the strain es will be about ten times larger than is attainable in the FIG. 1 configuration. If the substrate has a certain positive or negative CTE value (instead of a near-zero CTE), the amplification of strain will be higher or lower depending on the relative sign of the body CTE.

The substrate 90 can have a variety of shapes, the main consideration being that it extend adjacent the fiber for securing the grating and body of different lengths, i.e., the length of $l_1$ and $l_2$. Preferably, a flat-surfaced block or cylindrical configuration is used. The temperature-sensitive body 94 can also have a blocked or cylindrical shape. If the body 94 is made of positive CTE materials, the grating of FIG. 18 will contract on heating, and for negative CTE materials, the grating will elongate. The sign of induced strain can be reversed by modifying the design of the device. For example, if the temperature-sensitive body of FIG. 18 is attached onto the fiber grating at a Point B' instead of B, and the other end of the grating is attached to the substrate at Point A' instead of A, the grating will, for a body made of positive CTE material, be elongating instead of contracting. If a contracting strain on the fiber is used, the fiber should be placed in a tight-fitting, low-friction (optionally lubricated) capillary tube (48 of FIG. 11B), to minimize lateral deflection or local sticking of the fiber and maintain a uniform applied stress.

Figure 19:
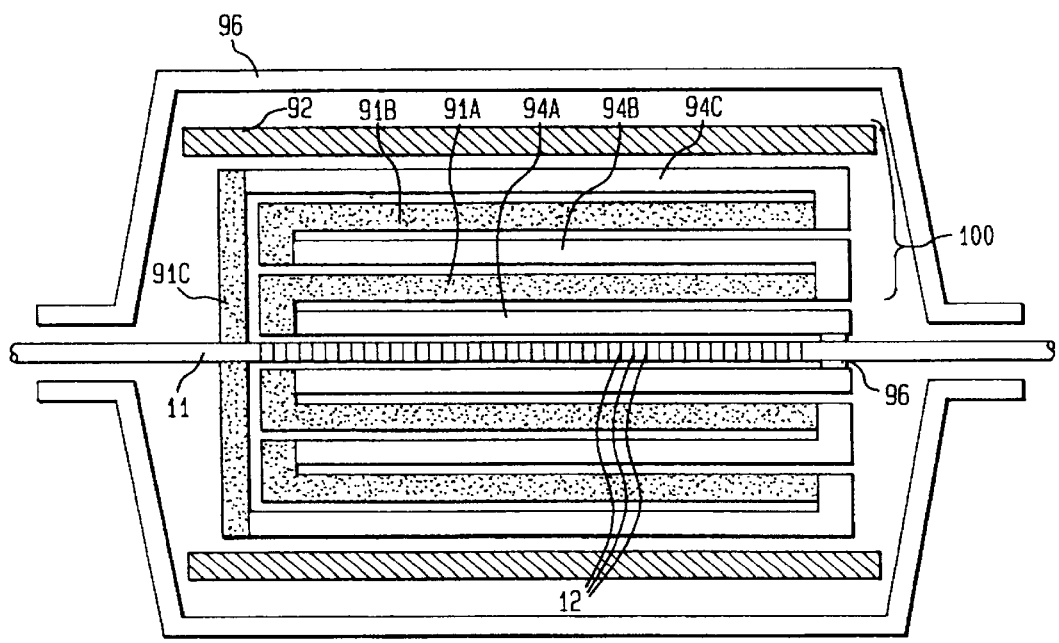

FIG. 19 shows another embodiment for amplifying the temperature-induced strain. For the temperature sensitive body, a stack 100 of interconnected temperature-insensitive layers 91A, 91B, 91C and temperature-sensitive layers 94A, 94B, 94C, is used. The layers are alternating so. that opposing ends of each temperature-sensitive layer are connected to different temperature-insensitive layers. With this configuration, the effective length of the temperature-sensitive body may be increased without increasing the total length of the device itself. This configuration is shown with a heating element 92 and an oven shell 96. The temperature-induced strain from the layers 94A, 94B, 94C accumulates to yield an amplified strain on the attached fiber 11 and fiber grating perturbations 12. As additional layers are added, more strain accumulates.

For example, an assembly consisting of 10 temperature-sensitive layers comprised of a 56%Ni-44%Ti alloy (CTE ~−200×10$^{-6}$/° C.) will produce, for a temperature change of about thirty degrees ($\Delta T=30°$ C.), a total strain of ($\epsilon$)=10× 200×10$^{-6}$/° C.×30° C.=6×10$^{-2}$, or 6%. Although this strain is close to the breaking strain of typical silica fibers, it demonstrates the maximum tuning range that is possible with this device. In view of the large amplification factor, the temperature-sensitive layers 94A, 94B, 94C, can even be made up of low CTE materials such as typical metals and alloys, e.g., brass (Cu-30%Zn) with CTE=+20.1×10$^{-6}$/° C., stainless steel (Fe-18%Cr-80%Ni) with CTE=+17.8×10$^{-6}$/° C., and an Fe—Ni—Cr alloy (Fe-35%Ni-20%Cr) with CTE=15.8×10$^{-6}$/° C. The temperature-insensitive layers can be made up of Invar (Fe-36%Ni alloy) or other alloys having a low CTE, as long as their CTE is substantially lower than that of the temperature-sensitive layers being interconnected. Alternatively, instead of the temperature-insensitive layers, temperature-sensitive layers with a CTE having an opposing sign can be used, which would amplify the temperature-induced strain even further. The temperature-sensitive and insensitive layers can be connected by a variety of bonding methods, including soldering, brazing, spot welding, epoxy bonding, or mechanical attachment such as hooks, screws, or the like.

Many alternative embodiments of the tunable grating are contemplated. For example, a plurality of fibers can be secured to a single temperature-sensitive body, as illustrated with FIG. 12E. Alternatively, a device containing a plurality of fibers or grating regions with different perturbation periods ($\Lambda_1$–$\Lambda_4$ and $\Lambda_5$–$\Lambda_8$) can be mounted on two different temperature-sensitive bodies, each body having its own heating element and temperature controller. The use of different temperature-sensitive bodies is advantageous in increasing the range of tunable wavelengths. For example, if only one of the temperature-sensitive bodies is activated (heated into the desired temperature level), corresponding wavelengths $\lambda_1$–$\lambda_4$ in the attached fiber gratings will be filtered out. However, if the other temperature-sensitive body is also activated, wavelengths $\lambda_5$–$\lambda_8$ will be filtered out. Thus, a tunable range of $\lambda_1$–$\lambda_8$ can be obtained, as opposed to $\lambda_1$–$\lambda_4$. Similar configurations rations can also be used with a multitude of gratings with the same spacing, $\Lambda$, for controlling many fiber communication routes simultaneously.

It is to be understood that the above-described embodiments are illustrative of only a few of the many possible specific embodiments which can represent applications of the invention. Numerous and varied other arrangements can be made by those skilled in the art without departing from the spirit and scope of the invention. All such variations are intended to be encompassed within the scope of the appended claims.

What is claimed is:

1. A device for tuning an optical fiber having a long-period grating region with spaced-apart perturbations, the device comprising:

two substantially L-shaped rigid bodies, each having a short arm terminating in a first end and a long arm terminating in a second end to define the L-shaped bodies, wherein the first end of each L-shaped rigid body is attached to the fiber adjacent the grating region and the long arm of each rigid body is aligned along the length of the fiber grating region and substantially parallel with the axis of the fiber with a gap disposed between them; and a substantially cylindrical wedge having a differential circumference, the differential circumference of the wedge being inserted into the gap in contact with the second end of each L-shaped rigid body so that when the circumference of the wedge is moved within the gap the wedge adds or withdraws a predetermined amount of displacement between the rigid bodies, thereby imposing a mechanical strain on the fiber to thereby change the spacing between the perturbations of the long-period grating region;

an actuating motor for moving the wedge within the gap: and a biasing element for biasing the two rigid bodies together.

2. A device for tuning an optical fiber having a long-period grating region with spaced-apart perturbations, the device comprising:

an integrally-formed resilient elongated member having two ends and a midsection, wherein the two ends are aligned along a first horizontal plane for attachment to a first surface of the fiber adjacent the grating region and the midsection is aligned with a second horizontal plane so that it is spaced-apart from the fiber when the two ends are secured to the fiber;

a substantially-flat substrate disposed against a second surface of the fiber adjacent the grating region;

a compression member configured to be pressed against the midsection of the resilient member so that the midsection is pressed toward the substrate and along a plane substantially perpendicular to the length of the fiber; and a motor for compressing the compression member against the resilient member at the midsection to impose a mechanically-induced strain on the fiber.

3. A device for tuning the wavelength response of an optical fiber having a long-period grating region with spaced-apart perturbations, the device comprising a substrate for securing the optical fiber and a mandrel for winding the optical fiber, wherein the fiber is fixedly secured adjacent one end of the grating region to the substrate and is secured adjacent the other end of the grating region to the mandrel so that when the mandrel rotates, it winds or unwinds the fiber, thereby changing the spacing between the perturbations of the long-period grating region.

4. An improved optical communications system of the type having a transmitter source for emitting an optical signal, a signal path comprising an optical fiber, a receiver, an amplifier disposed in the optical signal path for amplifying the transmitted signal, a pump source for pumping the amplifier, and a long-period fiber grating disposed in the optical fiber for equalizing the gain of the amplifier, the improvement comprising the device according to claim 8 for tuning the at least one optical fiber grating.

5. A device for tuning an optical fiber having a long-period grating region with spaced-apart perturbations, the device comprising:

a pair of magnets secured to the fiber adjacent the grating region and aligned so that their magnetic poles are disposed on a horizontal plane substantially parallel with the axis of the fiber, the magnets having a gap of less than 0.50 inches between them, and an electromagnet for applying a magnetic field to the magnets to cause them to move relative to each other, thereby changing the spacing between the perturbations of the long-period grating region, in which an AC demagnetizing field and a DC pulse current are alternatively applied to the electromagnet to provide a bistably tuned device.

6. The device according to claim 5, in which the strain-inducing body exhibits a magnetostrictive hysteresis loop wherein two levels of strain for bistable operation define a square loop shape with a squareness ratio of at least 0.85.

7. A device for tuning an optical fiber having a long-period grating region with spaced-apart perturbations, the device comprising:

a pair of magnets secured to the fiber adjacent the grating region and aligned so that their magnetic poles are disposed on a horizontal plane substantially parallel with the axis of the fiber, the magnets having a gap of less than 0.50 inches between them, and an electromagnet for applying a magnetic field to the magnets to cause them to move relative to each other, thereby chancing the spacing between the perturbations of the long-period grating region, in which the magnetic field is removed so that the strain-inducing body exhibits a remanent strain upon the fiber.

8. The device according to claim 7, in which the magnets are fabricated in a shape selected from the group consisting of a cylinder with a center hole, a rectangular block with a center hole, a two-piece cylindrical block, a two-piece rectangular block, a two-piece block with a grooved central axis, and a substantially flat substrate supporting the fiber.

9. The device according to claim 7, in which the magnets are fabricated from a material selected from the group consisting of Fe—Cr—Co, Fe—Al—Ni—Co (Alnico), Cu—Ni—Fe (Cunife), Co—Fe—V (Vicalloy), low-coercivity ($H_c$) rare earth cobalt, Nd—Fe—B, Ba-ferrite, and Sr-ferrite.

10. The device according to claim 7, further comprising a pair of extension rods, wherein one extension rod is disposed between each one of the magnets and the fiber for securing the magnets to the fiber.

11. The device according to claim 10, in which the extension rod is fabricated from a material selected from the group consisting of glass, aluminum, copper, stainless steel, low-coercivity programmable magnetic material, and field-amplifying soft magnetic material.

12. The device according to claim 7, further comprising a nonmagnetic substrate, wherein the fiber is attached adjacent one end of the grating region to the substrate, and one of the pair of magnets is attached to the substrate so that one of the pair of magnets is coupled to the fiber through the substrate.

13. A device for tuning an optical fiber having a lon-period grating region with spaced-apart perturbations, the device comprising:

a temperature-sensitive body having a predetermined coefficient of thermal expansion, the temperature-sensitive body being secured to the optical fiber adjacent the long-period grating region for transmitting strain to the fiber; and a heating element disposed adjacent the temperature-sensitive body for adjusting the temperature of the temperature-sensitive body and cause the temperature-sensitive body to place strain on the fiber, thereby changing the spacing between the perturbations of the long-period grating region.

14. The device according to claim 13, in which the heating element comprises a power source coupled to the temperature-sensitive body for sending electrical current to the temperature-sensitive body so that its temperature is adjusted through resistance.

15. The device according to claim 13, in which the temperature-sensitive body is fabricated with an alloy comprised of materials selected from the group consisting of nickel, titanium, copper, zinc, silicon, aluminum, and tin.

16. The device according to claim 13, in which the temperature-sensitive body is comprised of about forty-eight to sixty-four weight percent nickel and about thirty-six to fifty-two weight percent titanium.

17. The device according to claim 13, in which the temperature-sensitive body comprises a stack of interconnecting layers alternating between layers having a first coefficient of thermal expansion and layers having a second coefficient of thermal expansion for amplifying the strain transmitted to the fiber.

18. The device according to claim 17, in which the first coefficient of thermal expansion is either zero or has an opposite sign as compared with the second coefficient of thermal expansion.

19. The device according to claim 13, further comprising an oven shell surrounding the heating element and temperature-sensitive body for maintaining the temperature of the device.

20. The device according to claim 13, further comprising a feedback system for detecting the wavelength response of the grating and automatically adjusting the heating element to adjust the strain imposed by the temperature-sensitive body, thereby automatically tuning the wavelength response.

21. An improved optical communications system of the type having a transmitter source for emitting an optical signal, a signal path comprising an optical fiber, a receiver, an amplifier disposed in the optical signal path for amplifying the transmitted signal, a pump source for pumping the amplifier, and a long-period fiber grating with spaced-apart perturbations disposed in the optical fiber for equalizing the gain of the amplifier, the improvement comprising a device for tuning the at least one optical fiber grating, the device comprising:

a strain-inducing body secured to the optical fiber adjacent the long-period grating region for transmitting strain to the fiber; and a force-generating body disposed adjacent the strain-inducing body for interacting with the strain-inducing body to generate a force for causing the strain-inducing body to place strain on the fiber, thereby changing the spacing between the perturbations of the long-period grating region.

22. The device according to claim 3 further comprising a capillary tube for enclosing the fiber at the grating region to minimize lateral deflection of the fiber and maintain a uniform applied strain on the fiber.

* * * * *